US 8,316,178 B2

(12) United States Patent
Lund et al.

(10) Patent No.: US 8,316,178 B2
(45) Date of Patent: Nov. 20, 2012

(54) BUFFERING OF DATA TRANSFERS FOR DIRECT ACCESS BLOCK DEVICES

(75) Inventors: Timothy Lund, Rochester, MN (US); Carl Forhan, Rochester, MN (US); Michael Hicken, Rochester, MN (US)

(73) Assignee: LSI Corporation, Milpitas, CA (US)

( * ) Notice: Subject to any disclaimer, the term of this patent is extended or adjusted under 35 U.S.C. 154(b) by 308 days.

(21) Appl. No.: 12/731,631

(22) Filed: Mar. 25, 2010

(65) Prior Publication Data

US 2011/0072197 A1   Mar. 24, 2011

Related U.S. Application Data

(60) Provisional application No. 61/245,112, filed on Sep. 23, 2009, provisional application No. 61/245,973, filed on Sep. 25, 2009.

(51) Int. Cl.
*G06F 12/02* (2006.01)
*G06F 12/00* (2006.01)

(52) U.S. Cl. ............ 711/110; 711/109; 710/52; 710/53; 710/56

(58) Field of Classification Search .................. 711/109, 711/110; 710/52, 53, 56
See application file for complete search history.

(56) References Cited

U.S. PATENT DOCUMENTS

| | | | |
|---|---|---|---|
| 4,402,046 A | 8/1983 | Cox et al. | |
| 5,121,480 A * | 6/1992 | Bonke et al. | 711/2 |
| 5,297,029 A | 3/1994 | Nakai | |
| 5,353,410 A | 10/1994 | Macon et al. | |
| 5,732,409 A | 3/1998 | Ni | |
| 5,734,821 A | 3/1998 | Chung et al. | |
| 5,974,502 A | 10/1999 | DeKoning et al. | |
| 6,049,838 A | 4/2000 | Miller et al. | |
| 6,081,849 A | 6/2000 | Born et al. | |
| 6,145,072 A | 11/2000 | Shams et al. | |
| 6,158,004 A | 12/2000 | Mason et al. | |
| 6,212,617 B1 | 4/2001 | Hardwick | |
| 6,247,040 B1 | 6/2001 | Born et al. | |
| 6,324,594 B1 | 11/2001 | Ellis et al. | |
| 6,363,470 B1 * | 3/2002 | Laurenti et al. | 711/220 |
| 6,385,683 B1 | 5/2002 | DeKoning et al. | |
| 6,449,666 B2 | 9/2002 | Noeldner et al. | |
| 6,490,635 B1 | 12/2002 | Holmes | |
| 6,567,094 B1 * | 5/2003 | Curry et al. | 345/558 |
| 6,633,942 B1 | 10/2003 | Balasubramanian | |
| 6,678,785 B2 | 1/2004 | Lasser et al. | |

(Continued)

OTHER PUBLICATIONS

Kang et al. A superblock-based flash translation layer for NAND flash memory. 2006. In Proceedings of the 6th ACM & IEEE International conference on Embedded software (EMSOFT '06). ACM, New York, NY, USA, 161-170.*

(Continued)

*Primary Examiner* — Yaima Campos
*Assistant Examiner* — Samuel Dillon

(57) ABSTRACT

Described embodiments provide a method of transferring, by a media controller, data associated with a host data transfer between a host device and a storage media. A buffer layer module of the media controller segments the host data transfer into one or more data transfer segments. Each data transfer segment corresponds to at least a portion of the data. The buffer layer module allocates a number of physical buffers to a virtual circular buffer for buffering the one or more data transfer segments. The buffer layer module transfers, by the virtual circular buffer, each of the data transfer segments between the host device and the storage media through the allocated physical buffers.

20 Claims, 25 Drawing Sheets

U.S. PATENT DOCUMENTS

| | | | |
|---|---|---|---|
| 6,725,329 B1 | 4/2004 | Ng et al. | |
| 6,751,680 B2 | 6/2004 | Langerman et al. | |
| 7,069,559 B2 | 6/2006 | Janssen et al. | |
| 7,286,549 B2 | 10/2007 | Gaur | |
| 7,290,066 B2 | 10/2007 | Voorhees et al. | |
| 7,408,834 B2 | 8/2008 | Conley et al. | |
| 7,461,183 B2 | 12/2008 | Ellis et al. | |
| 7,472,331 B2 | 12/2008 | Kim | |
| 7,512,847 B2 | 3/2009 | Bychkov et al. | |
| 7,590,803 B2 | 9/2009 | Wintergerst | |
| 7,650,449 B2 | 1/2010 | Lu | |
| 7,653,778 B2 | 1/2010 | Merry et al. | |
| 7,925,847 B2 | 4/2011 | Ellis et al. | |
| 2003/0051078 A1 | 3/2003 | Yoshitake | |
| 2003/0110325 A1 | 6/2003 | Roach et al. | |
| 2003/0167395 A1 | 9/2003 | Chang et al. | |
| 2004/0044873 A1 | 3/2004 | Wong et al. | |
| 2004/0177212 A1 | 9/2004 | Chang et al. | |
| 2005/0114729 A1 | 5/2005 | Nielsen et al. | |
| 2005/0144516 A1 | 6/2005 | Gonzalez et al. | |
| 2005/0203988 A1 | 9/2005 | Nollet et al. | |
| 2006/0050693 A1 | 3/2006 | Bury et al. | |
| 2006/0095611 A1 | 5/2006 | Winchester et al. | |
| 2006/0123259 A1 | 6/2006 | Yokota et al. | |
| 2007/0028040 A1 | 2/2007 | Sinclair | |
| 2007/0109856 A1 | 5/2007 | Pellicone et al. | |
| 2007/0255889 A1 | 11/2007 | Yogev et al. | |
| 2007/0266200 A1 | 11/2007 | Gorobets et al. | |
| 2008/0034153 A1 | 2/2008 | Lee et al. | |
| 2008/0052446 A1 | 2/2008 | Lasser et al. | |
| 2008/0082726 A1 | 4/2008 | Elhamias | |
| 2008/0120456 A1* | 5/2008 | Lee et al. | 711/103 |
| 2008/0140916 A1 | 6/2008 | Oh et al. | |
| 2008/0155145 A1 | 6/2008 | Stenfort | |
| 2008/0162079 A1 | 7/2008 | Astigarraga et al. | |
| 2008/0224924 A1 | 9/2008 | Lethbridge | |
| 2008/0263307 A1 | 10/2008 | Adachi | |
| 2008/0279205 A1 | 11/2008 | Sgouros et al. | |
| 2009/0138663 A1 | 5/2009 | Lee et al. | |
| 2009/0172308 A1 | 7/2009 | Prins et al. | |
| 2009/0271562 A1 | 10/2009 | Sinclair | |
| 2009/0271796 A1 | 10/2009 | Kojima | |
| 2009/0282301 A1 | 11/2009 | Flynn et al. | |
| 2009/0285228 A1 | 11/2009 | Bagepalli et al. | |
| 2009/0287859 A1 | 11/2009 | Bond et al. | |
| 2009/0300277 A1 | 12/2009 | Jeddeloh | |
| 2009/0313444 A1 | 12/2009 | Nakamura | |
| 2010/0011260 A1 | 1/2010 | Nagadomi et al. | |
| 2010/0023800 A1 | 1/2010 | Harari et al. | |
| 2010/0122148 A1 | 5/2010 | Flynn et al. | |
| 2010/0325317 A1 | 12/2010 | Kimelman et al. | |
| 2011/0041039 A1 | 2/2011 | Harari et al. | |
| 2011/0055458 A1 | 3/2011 | Kuehne | |
| 2011/0099355 A1 | 4/2011 | Tran | |

OTHER PUBLICATIONS

Andrew Birrell & Michael Isard, et al., A Design for High-Performance Flash Disks, ACM SIGOPS, Operating Systems Review, vol. 41, Issue 2, pp. 88-93, (Apr. 2007).

Jeong-Uk Kang & Heeseung Jo, et al., A Superblock-Based Flash Translation Layer for NAND Flash Memory, Proceedings of the 6th ACM and IEEE International Conference on Embedded Software, pp. 161-170, (Oct. 22-25, 2006).

Sun et al.; On the Use of Strong BCH Codes for Improving Multilevel NAND Flash Memory Storage Capacity; ECSE Department, Rensselaer Polytechnic Institute, Aug. 2006; USA.

Micro Technology, Inc.; NAND Flash 101: An Introduction to NAND Flash and How to Design it into your next Product; TN-29-19; 2006; pp. 1-28; Micron Technology, Inc. Boise, Idaho, USA.

TCG Core Architecture Specification, Version 2.0, Trusted Computing Group, 2009 USA.

TCG Storage Interface Interactions Specification, Version 1.0, Trusted Computing Group, 2009 USA.

TCG Storage SSC: Enterprise, Version 1.0, Trusted Computing Group 2009 USA.

TCG Storage SSC: Opal, Version 1.0, Trusted Computing Group 2009 USA.

Specification for the Advanced Encryption Standard (AES), Federal Information Processing Standard (FIPS) Publication 197, 2001 USA.

Specification for the Secure Hash Standard (SHS), FIPS Publication 180-3 (2008), National Institute of Standards and Technology (NIST) USA.

\* cited by examiner

FIG. 4c
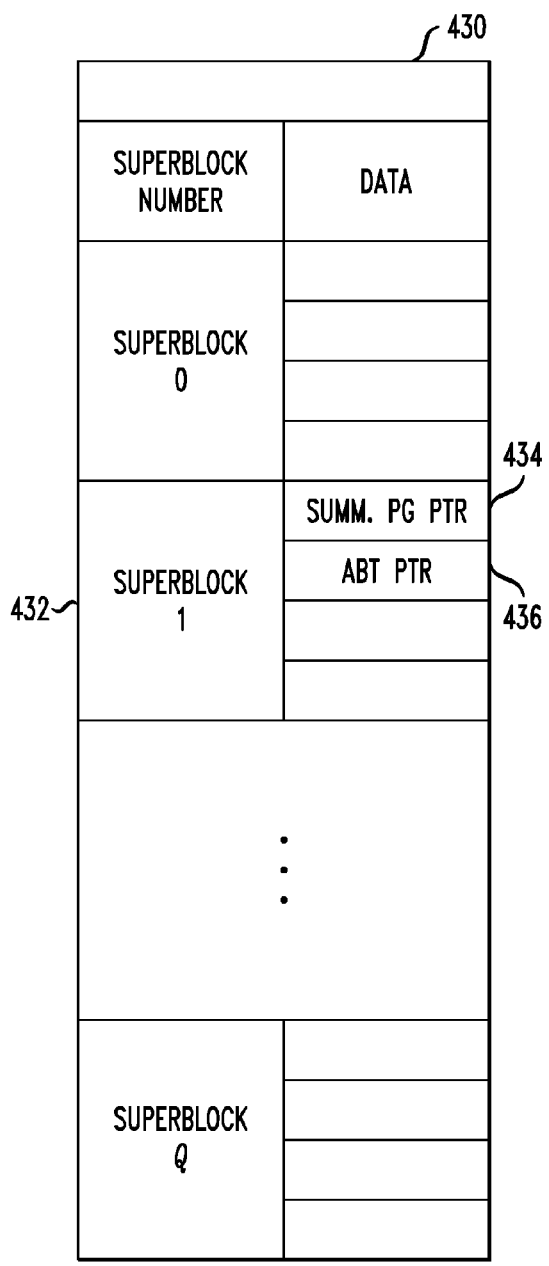
FIG. 4d
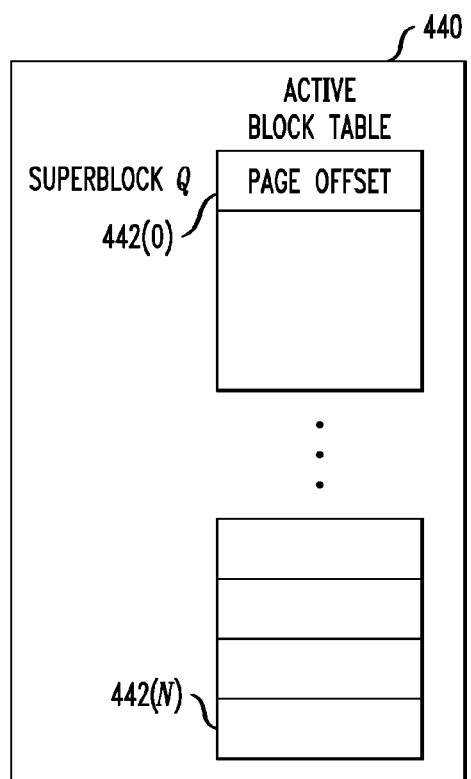
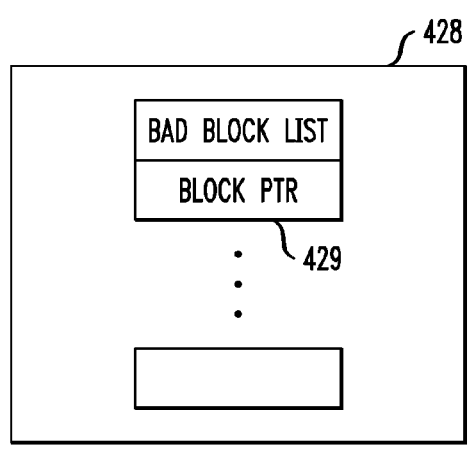

530

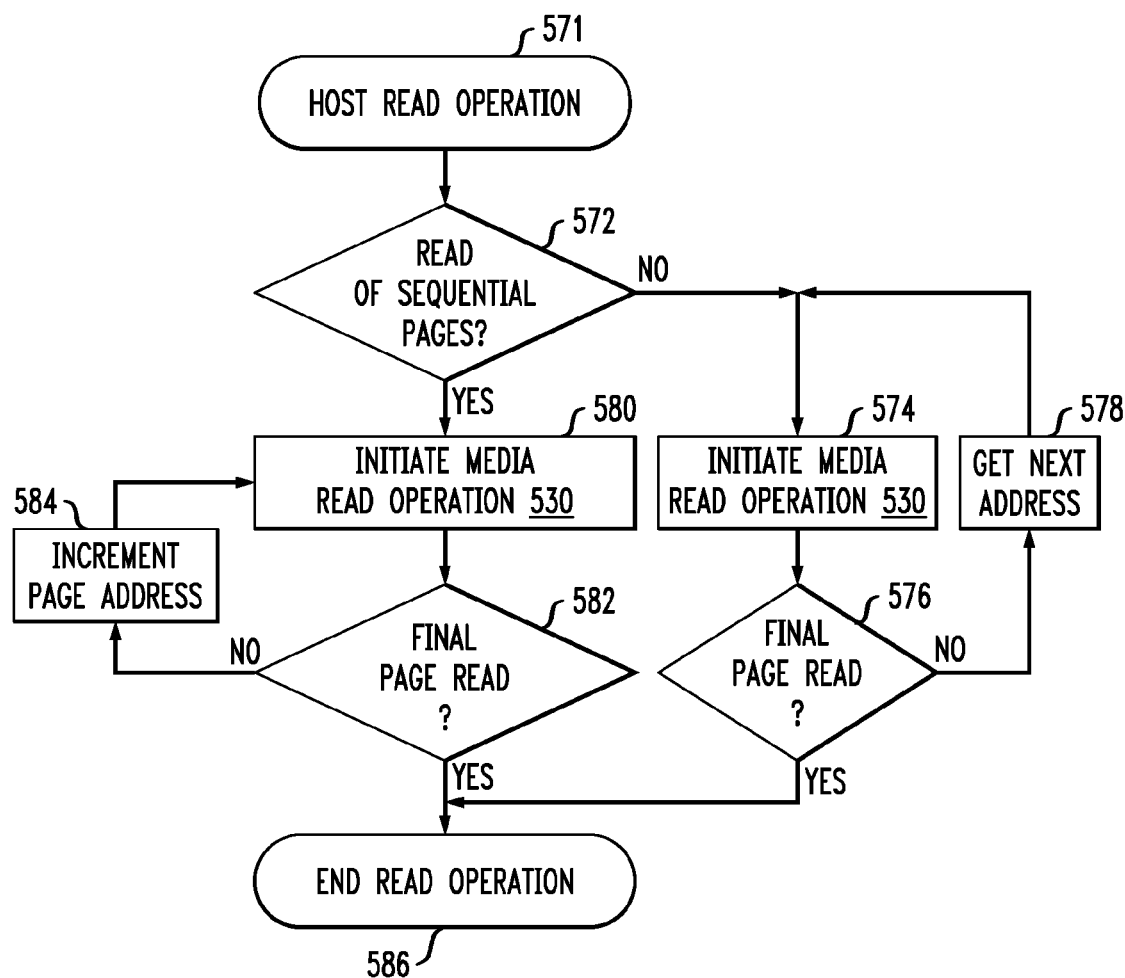

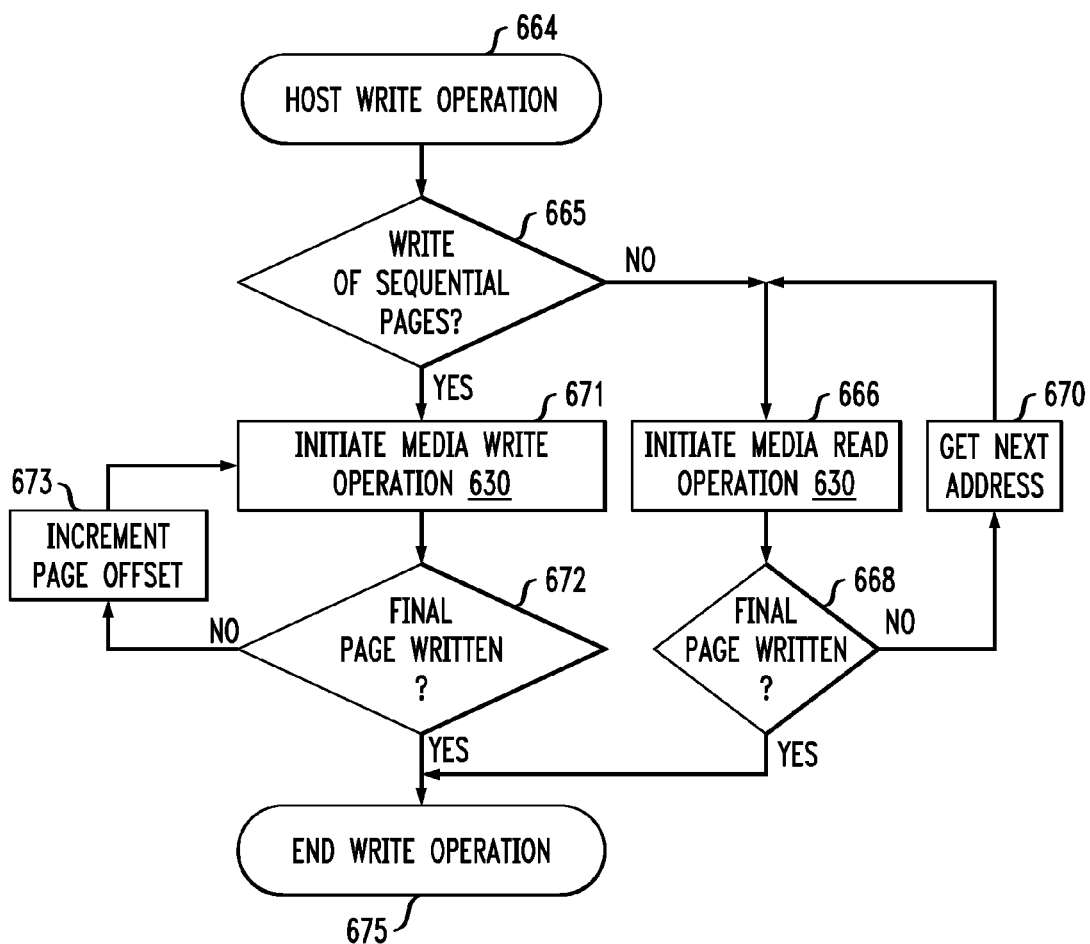

700

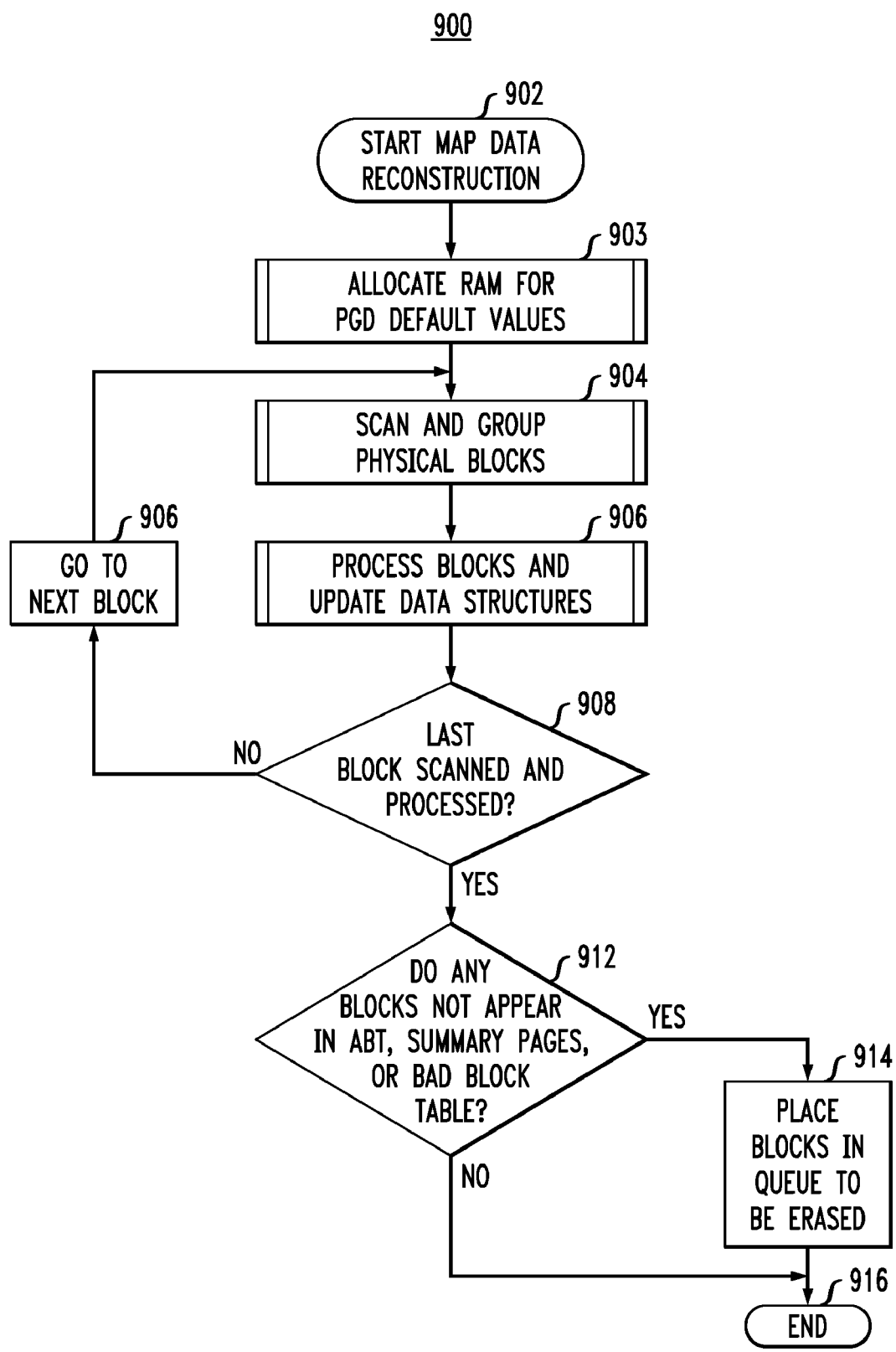

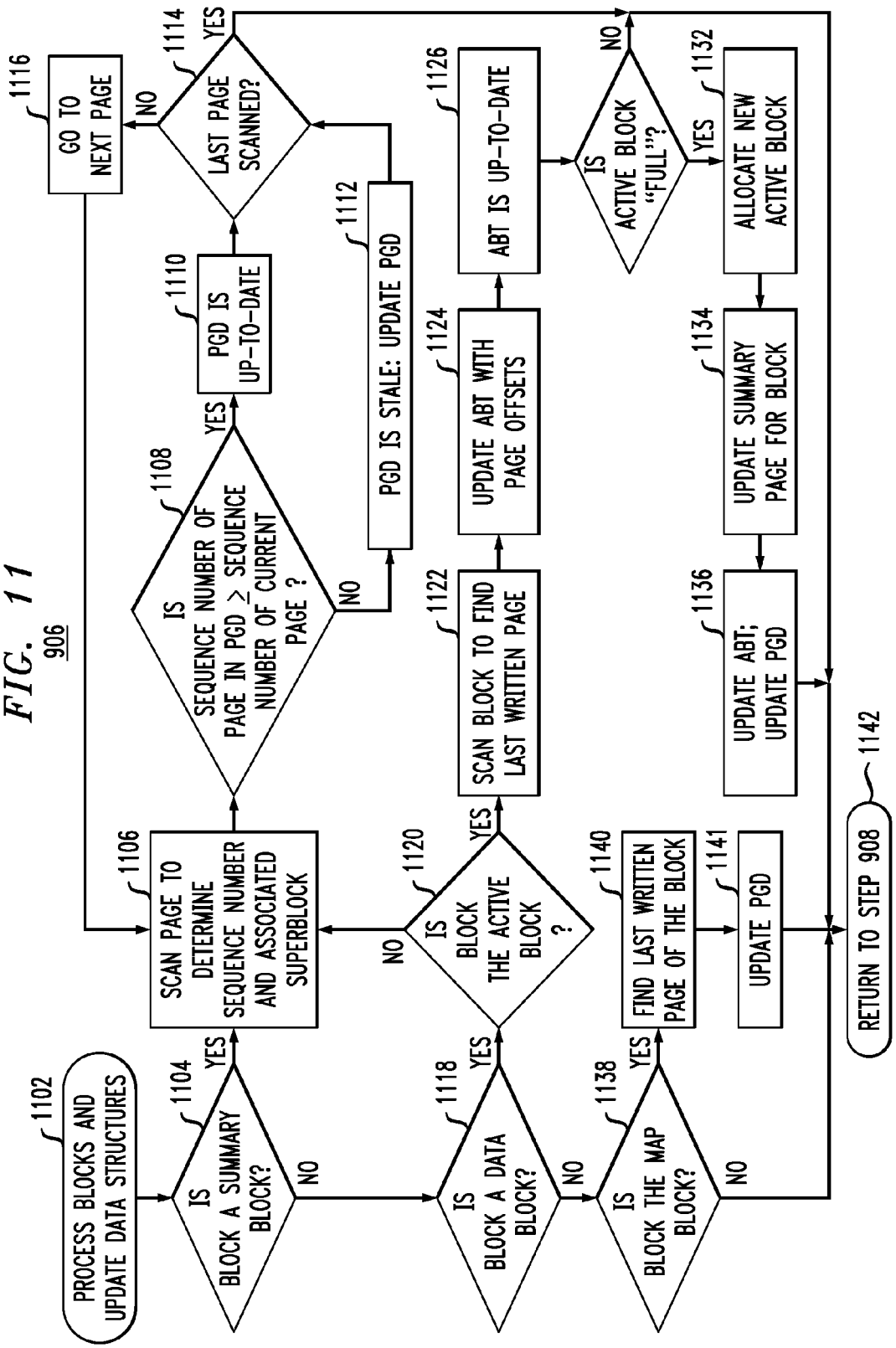

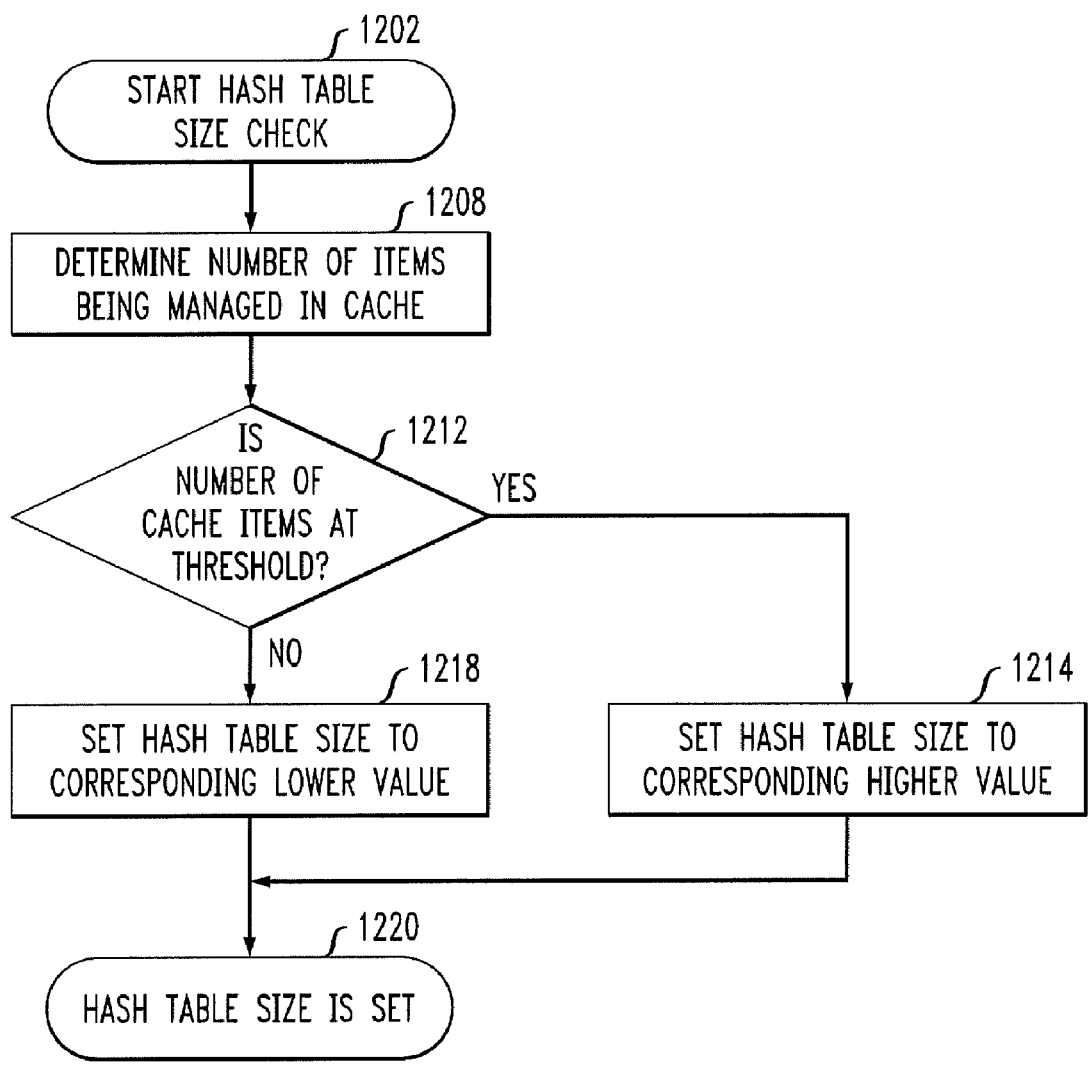

| NUMBER OF ITEMS | CACHE SIZE |
|---|---|
| 24 | 64 |
| 25 | 64 |
| ⋮ | 64 |
| 46 | 64 |
| 47 | 64 |
| 48 | 128 |
| ⋮ | 128 |
| 192 | 256 |

| WEAR-LEVEL UNIT | | | | | |
|---|---|---|---|---|---|
| 0 | SUMMARY PAGE 0 | SUMMARY PAGE 1 | ... | SUMMARY PAGE W | 1402(0) |
| 1 | SUMMARY PAGE 0 | SUMMARY PAGE 1 | ... | SUMMARY PAGE W | 1402(1) |
| ⋮ | ⋮ | ⋮ | ⋮ | ⋮ | |
| X | SUMMARY PAGE 0 | SUMMARY PAGE 1 | ... | SUMMARY PAGE W | 1402(X) |

BUFFERING OF DATA TRANSFERS FOR DIRECT ACCESS BLOCK DEVICES

CROSS-REFERENCE TO RELATED APPLICATIONS

This application claims the benefit of the filing date of U.S. provisional application Nos. 61/245,112 filed Sep. 23, 2009, and 61/245,973 filed Sep. 25, 2009, the teachings of which are incorporated herein in their entireties by reference.

The subject matter of this application is related to U.S. patent application Ser. Nos. 12/436,227 filed May 6, 2009, 12/475,710 filed Jun. 1, 2009, 12/475,716 filed Jun. 1, 2009, 12/477,996 filed Jun. 4, 2009, 12/478,013 filed Jun. 4, 2009, 12/508,879 filed Jul. 24, 2009, 12/508,915 filed Jul. 24, 2009, 12/643,471 filed Dec. 21, 2009, 12/649,490 filed Dec. 30, 2009, 12/722,828 filed Mar. 12, 2010, and 12/730,627 filed Mar. 24, 2010, the teachings of all of which are incorporated herein in their entireties by reference. The subject matter of this application is also related to U.S. patent application Ser. Nos. 12/767,985 filed Apr. 27, 2010, 12/768,058 filed Apr. 27, 2010, 12/769,882 filed Apr. 29, 2010 and 12/769,910 filed Apr. 29, 2010.

BACKGROUND OF THE INVENTION

1. Field of the Invention

The present invention relates to memory storage devices, and, in particular, to buffering of data transfers for direct access block devices, such as solid state disks (SSDs).

2. Description of the Related Art

Flash memory is a type of non-volatile memory that is electrically erasable and re-programmable. Flash memory is primarily used in memory cards and USB flash drives for general storage and transfer of data between computers and other digital products. Flash memory is a specific type of electrically erasable programmable read-only memory (EEPROM) that is programmed and erased in large blocks. One commonly employed type of flash memory technology is NAND flash memory. NAND flash memory forms the core of the flash memory available today, especially for removable universal serial bus (USB) storage devices known as USB flash drives, as well as most memory cards. NAND flash memory exhibits fast erase and write times, requires small chip area per cell, and has high endurance. However, the I/O interface of NAND flash memory does not provide full address and data bus capability and, thus, generally does not allow random access to memory locations.

There are three basic operations for NAND devices: read, write and erase. The read and write operations are performed on a page by page basis. Page sizes are generally $2^N$ bytes, where N is an integer, with typical page sizes of, for example, 2,048 bytes (2 kb), 4,096 bytes (4 kb), 8,192 bytes (8 kb) or more per page. Pages are typically arranged in blocks, and an erase operation is performed on a block by block basis. Typical block sizes are, for example, 64 or 128 pages per block. Pages must be written sequentially, usually from a low address to a high address. Lower addresses cannot be rewritten until the block is erased.

A hard disk is addressed linearly by logical block address (LBA). A hard disk write operation provides new data to be written to a given LBA. Old data is over-written by new data at the same physical LBA. NAND flash memories are accessed analogously to block devices, such as hard disks. NAND devices address memory linearly by page number. However, each page might generally be written only once since a NAND device requires that a block of data be erased before new data is written to the block. Thus, for a NAND device to write new data to a given LBA, the new data is written to an erased page that is a different physical page than the page previously used for that LBA. Therefore, NAND devices require device driver software, or a separate controller chip with firmware, to maintain a record of mappings of each LBA to the current page number where its data is stored. This record mapping is typically managed by a flash translation layer (FTL) in software that might generate a logical-to-physical translation table. The flash translation layer corresponds to the media layer of software and/or firmware controlling an HDD.

Associated with each page is a spare area (typically 100-500 bytes) generally used for storage of error correction code (ECC) information and for storage of metadata used for memory management. The ECC is generally needed for detecting and correcting errors in the user data stored in the page, and the metadata is used for mapping logical addresses to and from physical addresses. As such, the additional bytes of memory are "hidden" from the user and are not available for storing user data. The first block (block 0) of a flash die is generally provided from the manufacturer error-free, and is commonly used by designers to include program code and associated metadata for block management.

For consumer applications, HDDs generally have data sectors that are sized in powers of two (e.g. 512 ($2^9$) bytes per sector). Flash memories structured with page sizes that are a multiple of the HDD sector size might efficiently work with the HDD system by storing multiple entire sectors in a page (e.g. a 4096 byte page can store eight 512 byte sectors). However, enterprise-based HDD systems generally do not use sectors sized by powers of two, but use larger sectors, generally either 520 or 528 bytes per sector instead of 512 bytes. Thus, typical flash memories perform inefficiently for enterprise applications since there are unused bytes in each page.

Typically, for high capacity solid state disks (SSDs), several design tradeoffs might be considered when implementing a method to maintain a logical-to-physical translation table. These tradeoffs typically include: efficient random access memory (RAM) usage; efficient flash usage; fast address lookup for both read operations and write operations; fast write performance; and fast reconstruction of the translation table on device startup.

Several techniques are known in the art for maintaining the logical-to-physical translation table. One such approach is known as direct page mapping, an example of which is described in the paper by Andrew Birrell & Michael Isard, et al., A DESIGN FOR HIGH-PERFORMANCE FLASH DISKS, *ACM SIGOPS Operating Systems Review*, Vol. 41, Issue 2, pp. 88-93, (April 2007), which is incorporated herein by reference in its entirety (hereinafter "Birrell"). Direct page mapping maintains a lookup table in RAM having an entry for each flash page, and a summary page for metadata at the end of each block, from which the logical-to-physical translation table may be reconstructed at startup. For example, a direct page mapped translation table might contain, for every LBA, a logical sector number corresponding to a physical block number and a physical page number. Thus, direct page mapping comprises a single-level logical-to-physical translation. The summary page for each block might contain the LBA and valid bits for each page in the block so that the translation table can be reconstructed at startup. Thus, the direct page mapping scheme requires a large amount of RAM (on the order of 1-2 MB per GB of user storage) to store the translation table, which can become burdensome for higher capacity SSDs.

Another approach is known as block mapping. Block mapping generally classifies blocks as either data blocks (D-blocks) or update blocks (U-blocks). The total size of the D-blocks is the effective storage space for user data while U-blocks are invisible to users. Generally, when a write command cannot be accommodated in the D-block corresponding to the LBA, a U-block is allocated to receive the new data and the old data in the D-block is invalidated. Subsequent writes to that D-block will be received by the allocated U-block. When the U-block becomes full, another U-block might be allocated, or the U-block might be merged with the original D-block. Thus, block mapping maintains a lookup table in RAM that maps a logical block to a physical block. Block mapping lacks a page-level map, instead relying on the typical case that data is stored in sequential order within the block. For example, a block mapped translation table might contain a logical sector number corresponding to a logical block number and a logical page number. The logical block number can be translated into a physical block number and the logical page number might correspond to a physical offset within the physical block. Thus, block mapping comprises a two-level logical-to-physical translation. The size of the translation table is proportional to the number of blocks in the flash memory, thus requiring less RAM than a page mapped translation table.

However, because block mapping does not have a page-level map, the flash media may be inefficiently utilized when the data access workload is non-sequential. For non-sequential data access workloads, block mapping might require data to be copied and re-written numerous times to maintain the correct mapping. An example of block mapping is described in the paper by Jeong-Uk Kang & Heeseung Jo, et al., A SUPERBLOCK-BASED FLASH TRANSLATION LAYER FOR NAND FLASH MEMORY, *Proceedings of the 6th ACM & IEEE International Conference On Embedded Software*, pp. 161-170, (Oct. 22-25, 2006), which is incorporated herein by reference in its entirety (hereinafter "Kang").

A third approach for maintaining the logical-to-physical translation table is known as a superblock mapping scheme. Superblock mapping groups together a set number of adjacent logical blocks into a Superblock. Superblock mapping maintains a page global directory (PGD) in RAM for each Superblock. Page middle directories (PMDs) and page tables (PTs) are maintained in the spare areas of the flash pages. Each LBA can be divided into a logical block number and a logical page number, with the logical block number comprising a superblock number and a PGD index offset. The logical page number comprises a PMD index offset and a PT index offset. Each entry of the PGD points to a corresponding PMD. Each entry of the PMD points to a corresponding PT. The PT contains the physical block number and the physical page number of the data. To translate a logical address to a physical address in Superblock mapping, a module must access RAM to read the PGD, access flash to read the PMD, access flash to read the PT, and access flash to access the requested data address. Super-block mapping, thus, comprises a four-level logical-to-physical translation and provides page-mapping.

The PMD's and PT's are stored in the spare areas of the flash pages to provide page-mapping without using an excessive amount of RAM. However, because the spare area is used to store page-level mapping information, less memory is available for error correction codes (ECC). Further, the limited amount of memory available in the spare area precludes storing complicating mapping information. Finally, reconstruction of the translation table at startup can be time-intensive. An example of a superblock mapping scheme is described in Kang.

As described previously, for write operations, NAND devices store the new data for the LBA on a new page, unlike hard disk drives (HDDs) that can rewrite individual physical sectors. Thus, a NAND device generally requires that a block be erased before new data can be written to the block. Further, as described above, often a NAND device will write new data for a given LBA to an erased page that is a different physical page from the page previously used for that LBA. Thus, NAND devices also generally require the device driver software or the separate controller chip periodically initiate a process to erase data that is "stale" or out-of-date. As would be apparent to one of skill in the art, without periodically erasing out-of-date data, the flash memory would fill up with data that is mostly out-of-date. This inefficiency would reduce the realized flash memory capacity because less current data could be stored. Therefore, device driver software or controller chips generally periodically run a "garbage collection" routine adapted to provide efficient flash memory utilization by erasing out-of-date blocks. An example of a garbage collection routine is described in Kang. Garbage collection routines impact performance of the flash memory system by utilizing processor resources and potentially delaying write operations to the flash media.

However, NAND device blocks can be erased relatively few times before device failure (typically on the order of 100,000 erasures). Therefore, over the operational life of an SSD, blocks of flash memory will fail and become unusable. Thus, the device driver software or the separate controller chip should minimize the number of erasures, and must also maintain a record of bad blocks. For example, device driver software or controller chips might implement wear leveling to spread the erasing and writing of blocks over the entire flash memory to avoid repeatedly erasing and writing a given subset of blocks.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a method of transferring, by a media controller, data associated with a host data transfer between a host device and a storage media. A buffer layer module of the media controller segments the host data transfer into one or more data transfer segments. Each data transfer segment corresponds to at least a portion of the data. The buffer layer module allocates a number of physical buffers to a virtual circular buffer for buffering the one or more data transfer segments. The buffer layer module transfers, by the virtual circular buffer, each of the data transfer segments between the host device and the storage media through the allocated physical buffers.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 4c shows an exemplary data structure for a Page Global Directory (PGD) as might be employed by embodiments of the present invention;

FIG. 4d shows an exemplary data structure for an Active Block Table (ABT) as might be employed by embodiments of the present invention;

FIG. 5c shows a flow diagram of a media read operation performed by a host layer of the flash memory storage system of FIG. 1 operating in accordance with exemplary embodiments of the present invention;

FIG. 6c shows a flow diagram of a media write operation performed by a host layer of the flash memory storage system of FIG. 1 operating in accordance with exemplary embodiments of the present invention;

FIG. 9 shows a flow diagram of a logical-to-physical translation table reconstruction operation in accordance with exemplary embodiments of the present invention;

FIG. 10b shows a block diagram of the flash media block grouping employed by the scan and group blocks sub-routine of FIG. 10a;

FIG. 11 shows a flow diagram of a process blocks and update data structures sub-routine of the logical-to-physical translation table reconstruction operation of the exemplary embodiment of FIG. 9;

FIG. 12 shows a flow diagram of a flexible cache allocation operation in accordance with exemplary embodiments of the present invention;

FIG. 13 shows the size of the cache of the exemplary embodiment of FIG. 12;

FIG. 14 shows a block diagram of a summary page cache data structure in accordance with exemplary embodiments of the present invention;

DETAILED DESCRIPTION

In accordance with embodiments of the present invention, a flash controller is provided that divides data transfers internally into smaller segments ("chunks") and employs one or more virtual circular buffers to provide parallel processing of host-side and media-side data transfers. A buffer layer module of the flash controller might allocate one or more physical buffers to the virtual circular buffer. Additional physical buffers might be allocated to the virtual circular buffer depending on the availability of resources of the media controller. The one or more physical buffers of the virtual circular buffer might be employed to provide parallel processing of host-side and media-side data transfers. Embodiments of the present invention might provide multiple virtual circular buffers operating simultaneously to support parallel processing of multiple large data transfers across one or more storage devices.

Figure 1:
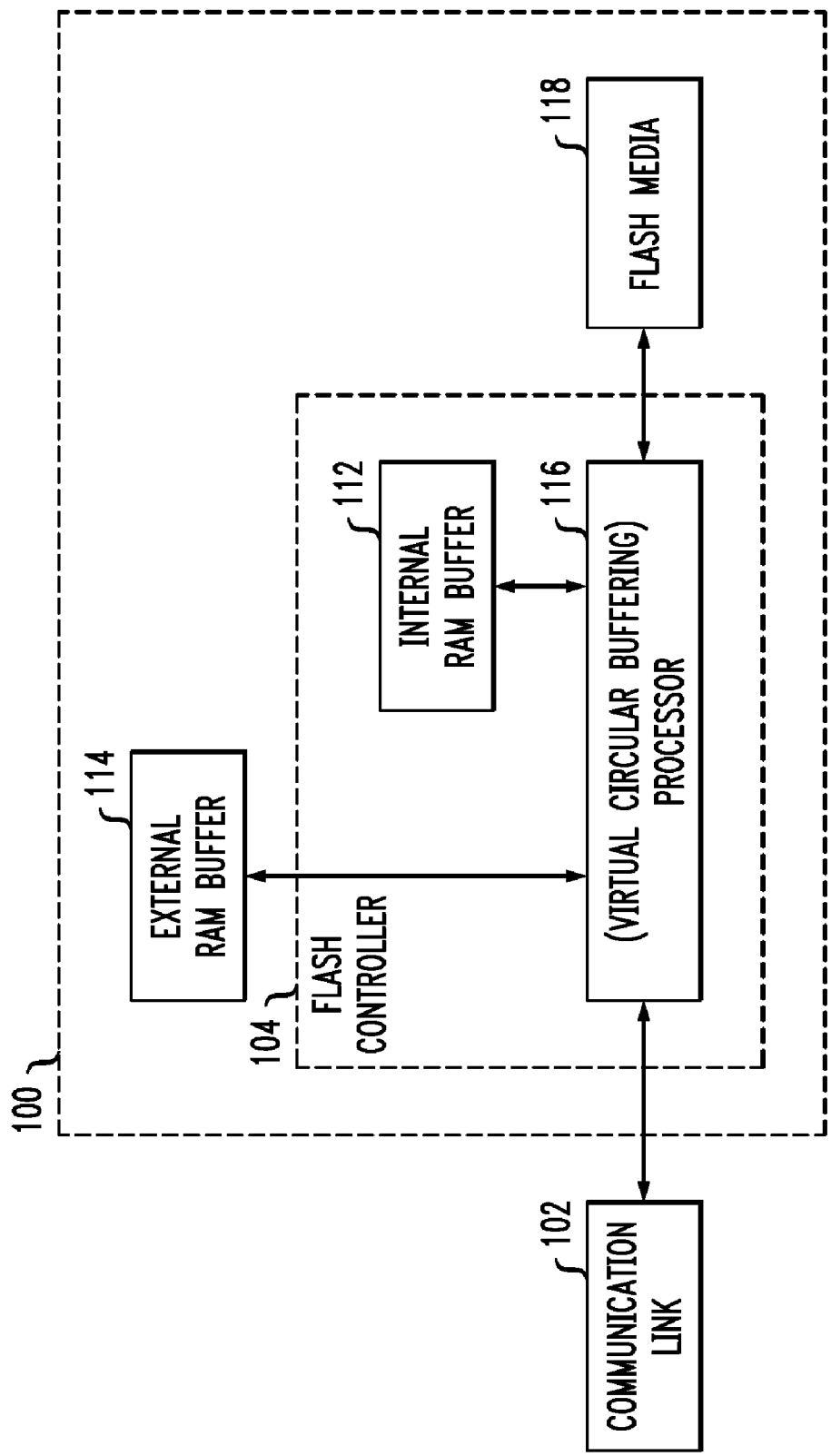
FIG. 1 shows a block diagram of a flash memory storage system implementing logical-to-physical translation in accordance with exemplary embodiments of the present invention.

FIG. 1 shows a block diagram of flash memory storage system 100 implementing a logical-to-physical translation in accordance with exemplary embodiments of the present invention. As shown, flash memory storage system 100 is electrically coupled to communication link 102. Flash memory storage system 100 comprises flash controller 104, optional external RAM buffer 114, and flash media 118. Although generally described herein as flash media, media 118 might be implemented as at least one of an SSD, an HDD, or a hybrid magnetic and solid state storage system. Communication link 102 is employed for communication with one or more external devices, such as a computer system or networking device, which interface with flash memory storage system 100. Communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, and IEEE 802.16 link, or any other similar interface link for connecting a peripheral device to a computer.

Flash controller 104 controls transfer of data between flash media 118 and an external device coupled to communication link 102. Flash controller 104 might be implemented as a system-on-chip (SoC). Flash controller 104 might include internal RAM buffer 112 and might also be coupled to additional external memory, shown as external RAM buffer 114. In an exemplary embodiment, internal RAM buffer 112 comprises 128 kB of static RAM (SRAM) and external RAM buffer 114 comprises 512 MB of double data rate version 2 dynamic RAM (DDR2 DRAM). RAM buffer 112 might act as a cache for processor 116, while RAM buffer 114 might act as a read/write buffer between flash media 118 and communication link 102. Processor 116 includes software and/or firmware as needed for operation, including for logical-to-physical translation in accordance with exemplary embodiments of the present invention, as described subsequently. Although shown in FIG. 1 as a single processor, processor 116 might be implemented with multiple processors. For embodiments having multiple processors, inter-processor communication might be employed, such as described in related U.S. patent application Ser. No. 12/436,227.

Figure 2:
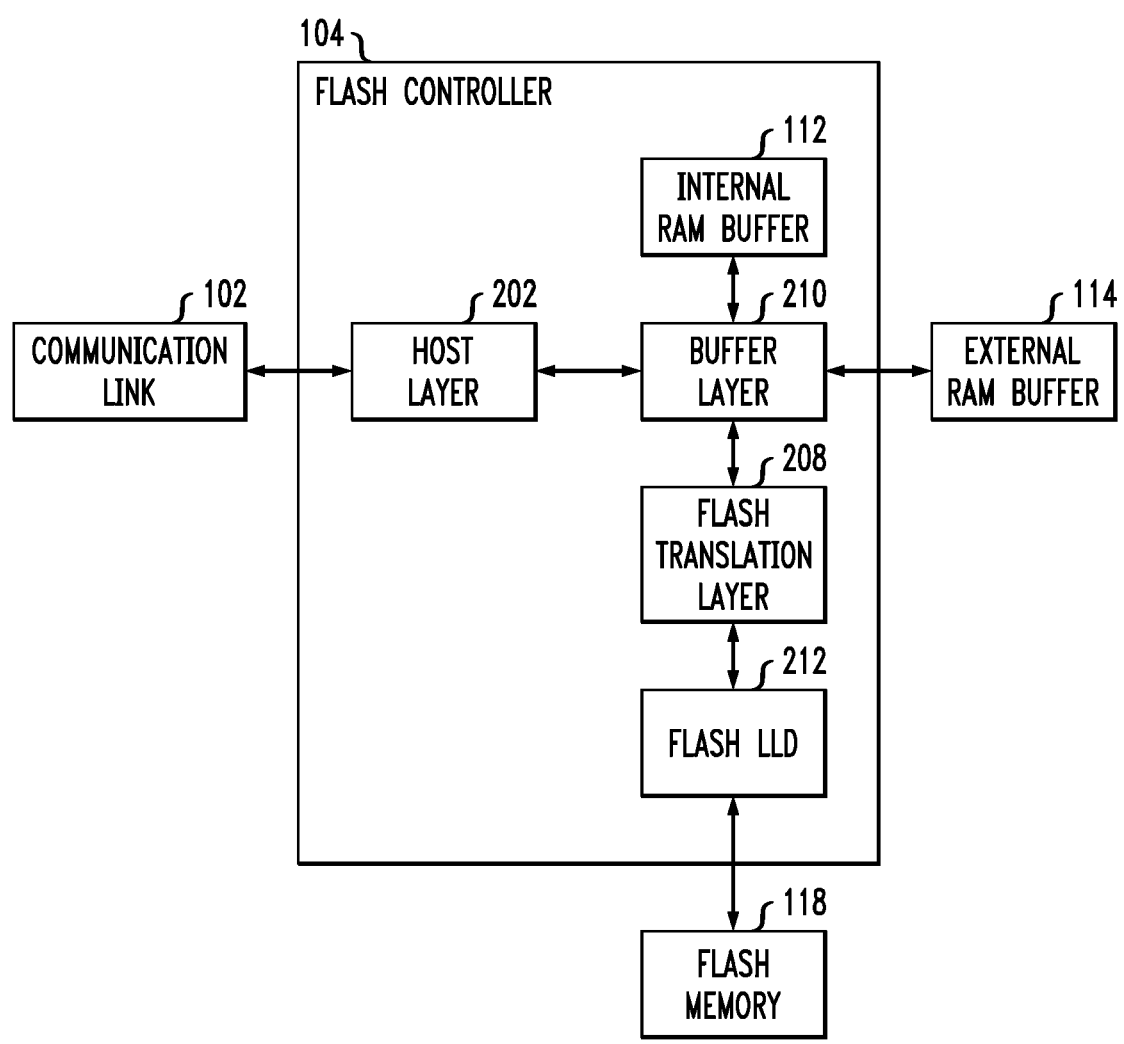
FIG. 2 shows an exemplary functional block diagram of processes employed by the flash memory storage system of FIG. 1.

FIG. 2 shows an exemplary functional block diagram of process modules implemented as software, hardware, or some combination thereof, within processor 116 and flash controller 104. As shown in FIG. 2, host layer 202 implements protocols to control flow of data between communications link 102 and flash controller 104. For example, host layer 202 might process data access commands from communication link 102 and communicate with flash translation layer (FTL) 208. In embodiments of the present invention, FTL 208 translates the logical-to-physical addresses (and vice-versa) of data stored in flash media 118, for example, by making flash memory storage system 100 appear similar to a conventional HDD. FTL 208 temporarily stores data in a target buffer via buffer layer 210. In general, data transfers between flash media 118 and communication link 102 are buffered in the target buffer that includes at least one of external RAM buffer 114 and internal RAM buffer 112. FTL 208 interfaces with flash media 118 by flash low-level driver 212. Flash low-level driver 212 implements hardware-specific basic read and write operations of flash memory 118, thus, separating the low-level hardware-specific signal and timing requirements of the flash memory circuitry from the functionality of FTL 208. FTL 208 also enables garbage collection, error recovery, and wear leveling routines for flash media 118. Host layer 202, buffer layer 210 and flash translation layer 208 might include Application Programming Interfaces (APIs), which are protocols or formats used by software to communicate between sub-applications within the software.

For example, flash controller 104 receives one or more requests for flash media access, such as read or write operations, from one or more external devices via communication link 102. Such requests for access to flash media 118 generally include at least one logical block address (LBA) where data should be read or written. For example, the requests might be to read from or write to a i) single flash address, ii) a group of contiguous flash addresses, or iii) a group of non-contiguous flash addresses. Received requests are processed by host layer 202. Host layer 202 i) controls host interface-specific commands (e.g. SATA commands), ii) coordinates host-side data transfers and command execution, and iii) processes any other host commands (e.g. status updates). Host layer 202 is in communication with buffer layer 210. FTL 208 translates the LBA into a physical address of the desired data. FTL 208 also interfaces with buffer layer 210. Since data transfers between communication link 102 and flash media 118 are temporally stored in buffer memory, buffer layer 210 generally directs the data traffic between host layer 202 and FTL 208. For example, if an external host (not shown) provides, via communication link 102, data to be written to flash media 118, buffer layer 210 might coordinate temporary storage of the data in buffer 114 until FTL 208 coordinates writing the data to flash media 118. Similarly, if the external host requests to read data from flash media 118, buffer layer 210 might temporarily store the data in buffer 114 until host layer 202 coordinates sending the data to the host via communication link 102.

Figure 3:
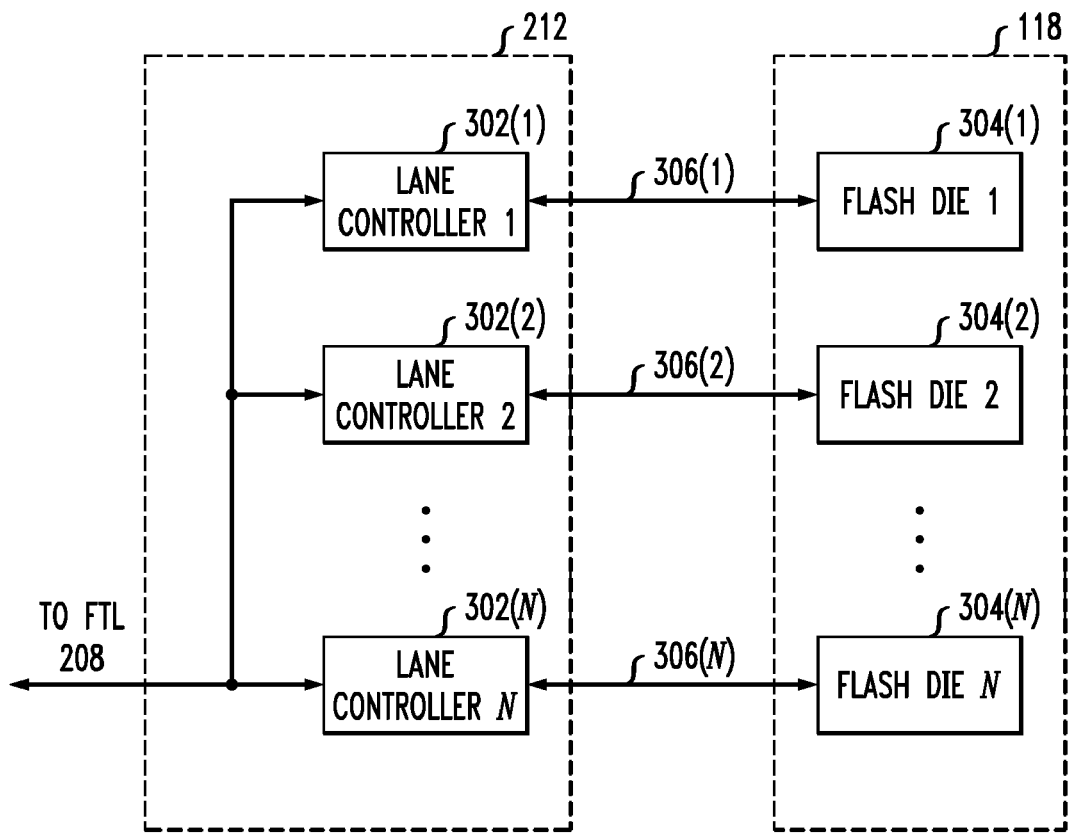
FIG. 3 shows additional detail of the flash memory storage system of FIG. 1.

FIG. 3 shows an exemplary embodiment of flash media 118 and flash low-level driver 212, in accordance with embodiments of present invention. As shown, flash media 118 might include one or more physical silicon dies, shown as flash dies 304(1) through 304(N). As shown, each flash die is in communication with flash low-level driver 212 via a "lane", shown as lanes 306(1) through 306(N). Additionally, flash low-level driver 212 includes one or more lane controllers, shown as lane controllers 302(1) through 302(N), corresponding to each lane and flash die.

Embodiments of the present invention include groups of Superblocks called wear-level units. Host requests might be striped across multiple wear-level units to provide parallel execution. Striping might be performed on a per page basis, meaning that each page is striped across multiple wear-level units. In exemplary embodiments of the present invention, a wear-level unit might correspond to one flash die as shown in FIG. 3. For example, flash dies 304(1) through 304(N) might be configured such that data is "striped" across two or more dies analogously to hard drives in a redundant array of independent disks (RAID), with each die 304(1) through 304(N) corresponding to a wear-level unit. Alternatively, embodiments of the present invention might configure each flash die 304(1) through 304(N) as a separate, stand-alone flash memory device without data striping.

Figure 4A:
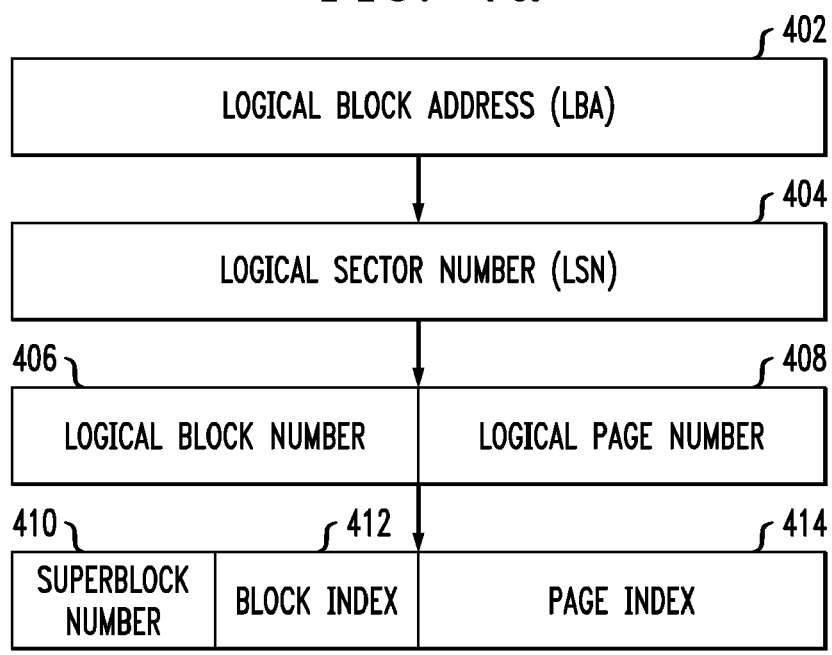
FIG. 4a shows an exemplary relation of a logical address of data to a physical address of data as managed by a flash translation layer of the flash memory storage system of FIG. 1 operating in accordance with embodiments of the present invention.
Figure 4B:
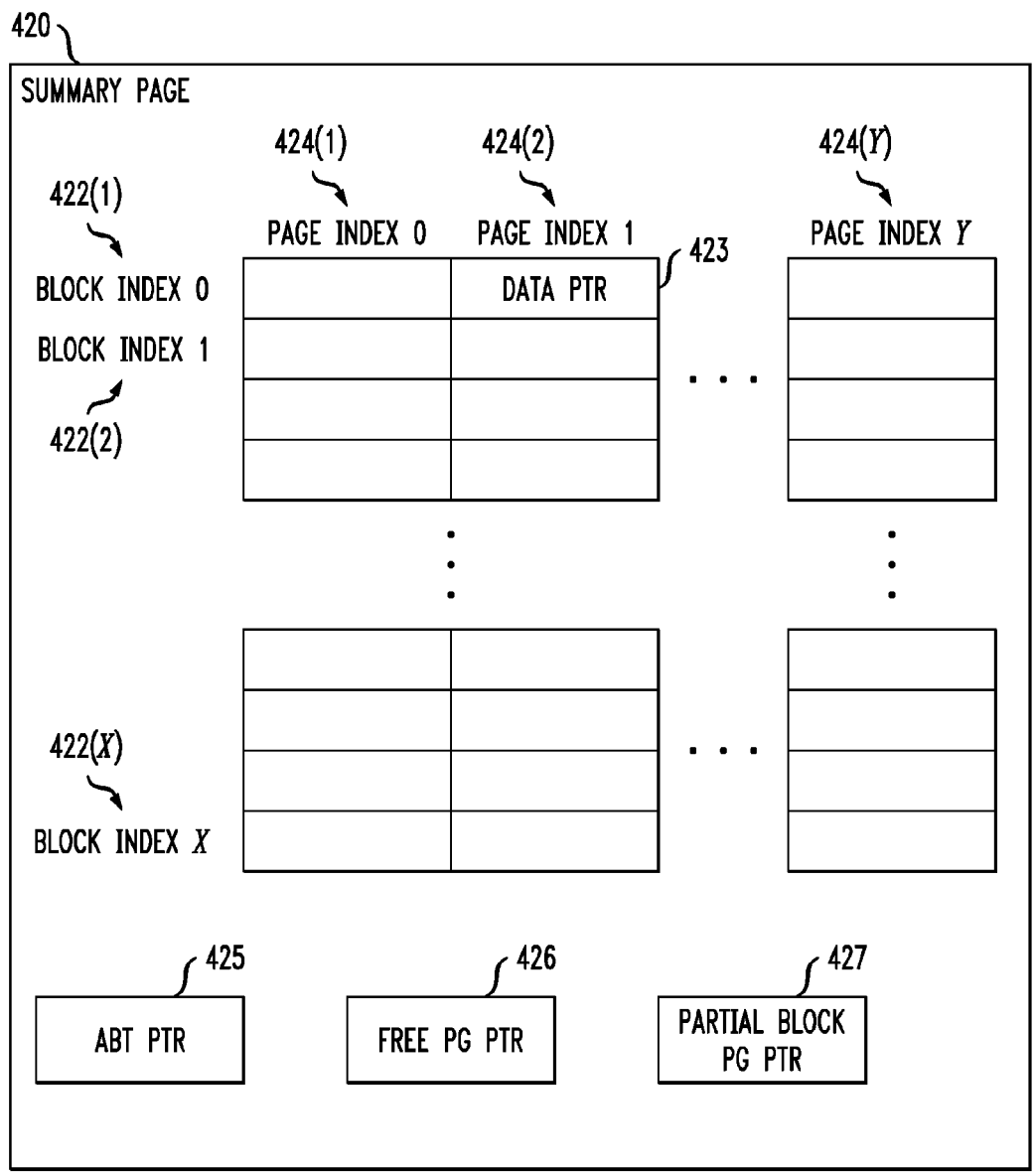
FIG. 4b shows an exemplary data structure for a summary page as might be employed by embodiments of the present invention.

FIGS. 4a-4d show block diagrams of exemplary data structures employed by FTL 208 for logical-to-physical translation of memory addresses. FIG. 4a shows an exemplary relation of a logical address of data (LBA 402) to a physical address of data (Superblock number 410, Block index 412 and Page Index 414) as managed by FTL 208 of FIG. 2. FIG. 4b shows Summary Page 420, FIG. 4c shows Page Global Directory (PGD) 430, and FIG. 4d shows Active Block Table (ABT 440). As described previously with regard to FIG. 2, when a host device requests access to flash media 118, the request generally includes a logical block address (LBA), which FTL 208 translates into a physical address of the desired data. As shown in FIG. 4a, LBA 402 corresponds to at least one logical sector number (LSN) 404. LSN 404 corresponds to the smallest writable unit of a host device coupled to communication link 102. For example, LSN 404 generally might correspond to a sector size of 512 bytes, which is the typical sector size for traditional hard drives (HDDs).

LSN 404 corresponds to a logical block number (LBN) 406 and a logical page number (LPN) 408. FTL 208 derives LBN 406 by dividing LSN 404 by a number of sectors per block of flash media 118. FTL 208 derives LPN 408 by dividing LSN 404 by a number of sectors per page of flash media 118. LBN 406 in turn corresponds to Superblock number 410 and block index 412, while LPN 408 corresponds to page index 414. As described, a Superblock generally is a logical collection of blocks representing a fixed range of LBAs. FTL 208 derives Superblock number 410 and block index 412 from LBN 406 by dividing LBN 406 by a number of blocks per Superblock, where Superblock number 410 corresponds to the quotient and block index 412 corresponds to the remainder. Page index 414 is derived from LPN 408 by dividing LPN 408 by a number of pages per block, and page index 414 represents the physical page offset within the block. For example, if a flash page size is 4096 bytes, and the sector size is 512 bytes, each flash page can store up to 8 sectors. An exemplary block might contain 128 pages. In this example, LPN 408 is equal to LSN 404 divided by 8, and page index 414 is equal to LPN 408 divided by 128.

As described herein, each page includes a small spare area generally used to store error correcting code (ECC) data. The ECC fields are written to the spare area by flash controller 104 (FIG. 1). In addition to storing ECC data, embodiments of the present invention might use the spare area of each page to store additional information for logical-to-physical address translation. For example, FTL 208 of FIG. 2 might store the wear-level unit number corresponding to the physical block in the spare area of one or more pages of the block. FTL 208 might store a sequence number (SN) in the spare area of one or more pages of a physical block. The SN might represent the order in which FTL 208 assigned the block to the Superblock. Each time a block is assigned for data storage, the SN is incremented. Thus, blocks having a higher SN were assigned more recently than blocks having a lower SN. The SN might also represent the order in which FTL 208 wrote the pages of the block, where every time a page is written, the SN is incremented such that more recently written pages have a higher SN. FTL 208 might also store the LSN corresponding to the page in the spare area, or store a bad block indicator (BBI) in the spare area of one or more pages of a block that has failed (in whole or in part). Embodiments of the present invention might further utilize the spare area to support enterprise system sector sizes (e.g. 520 or 528 bytes per sector instead of 512 bytes), such as described in related U.S. patent application Ser. Nos. 12/477,996 and 12/478,013.

Each Superblock has a summary page, shown in FIG. 4b as summary page 420. Summary page 420 contains the summary mapping data for the associated Superblock. For example, summary page 420 contains the block index and page index, shown as block indices 422(1)-422(X) and page indices 424(1)-424(Y) for all X blocks and all Y pages in Superblock associated with the summary page. The summary page block indices include all physical blocks (both data blocks and update blocks) within the Superblock. Together, block indices 422(1)-422(X) and page indices 424(1)-424(Y) are stored as data pointer 423, which points to the physical address of each page of the Superblock. Summary page 420 might also include a pointer to the location of the Active Block (active block pointer 425) and next free page (free page pointer 426) within the Superblock, as well as the location of the next page of a partially written block as a result of garbage collection (partial block page pointer 427). The summary page generally includes all necessary information to convert a logical address to a physical address of flash media 118. Embodiments of the present invention might perform garbage collection to erase pages containing out-of-date data, such as described in related U.S. patent application Ser. No. 12/508,879. As will be described subsequently with regard to FIGS. 6b-d, the summary page is updated periodically by FTL 208 to include more up-to-date mapping data that might be stored in ABT 440 or PGD 430 for each Superblock, for example, the block index of the active block and the page index to the next free page.

As shown in FIG. 4c, PGD 430 is a data structure that includes a series of entries for each Superblock (shown as Superblocks 0-Q) in a wear-level unit. PGD 430 might include the pointer (block index and page index) to the summary page associated with each Superblock (for example, summary page pointer 434 corresponding to Superblock 1 432). PGD 430 might include ABT pointer 436 that points to the location of the active block table (e.g. ABT 440) for the Superblock. PGD 430 might be stored in a reserved area of flash media 118 with other mapping data, such as summary pages.

Each Superblock has an Active Block Table (ABT), shown in FIG. 4d as ABT 440. ABT 440 tracks the currently active block in each Superblock in a wear-level unit. ABT 440 contains, for each Superblock Q in a wear-level unit, a list of page offsets indicating the written pages of the active block in the Superblock, shown as page offsets 442(0)-442(N). ABT 440 might be written in top-down order such that page offset 442(0) corresponds to the first page written in the active block, and page offset 442(N) corresponds to the most recently written page in the active block. As will be described herein, ABT 440 might represent mapping data for the active block of a Superblock for write operations that have been completed to flash, but the corresponding summary pages have not yet been updated. ABT 440 might be stored in RAM (e.g. at least one of buffer 112 and buffer 114) and reconstructed at startup of the storage device from summary pages stored in media 118. The interaction between PGD 430, ABT 440 and updating of summary pages (e.g. summary page 420 of FIG. 4b) will be described in greater detail with regard to FIG. 6d. As shown in FIG. 4d, each wear-level unit might also contain a list of failed blocks (bad block list 428) that includes pointers (bad block pointer 429) to failed blocks within the wear-level unit.

In exemplary embodiments of the present invention, summary pages (e g summary page 420 of FIG. 4b) for all the Superblocks of a wear-level unit are stored "out-of-line" in a separate Superblock (the summary page Superblock). Thus, no pages in data Superblocks are used to store mapping data, keeping the number of available pages per block to a power of two. In exemplary embodiments of the present invention, one or more Superblocks of each wear-level unit (the "map Superblocks") might be reserved to store mapping data. The summary page of the map Superblock (the "map page") and is saved "in-line" as the first page of the map Superblock. FTL 208 (FIG. 2) is configured to skip reserved Superblocks, making them inaccessible by host requests, thus "reserving" the Superblocks for mapping data.

Figure 5A:
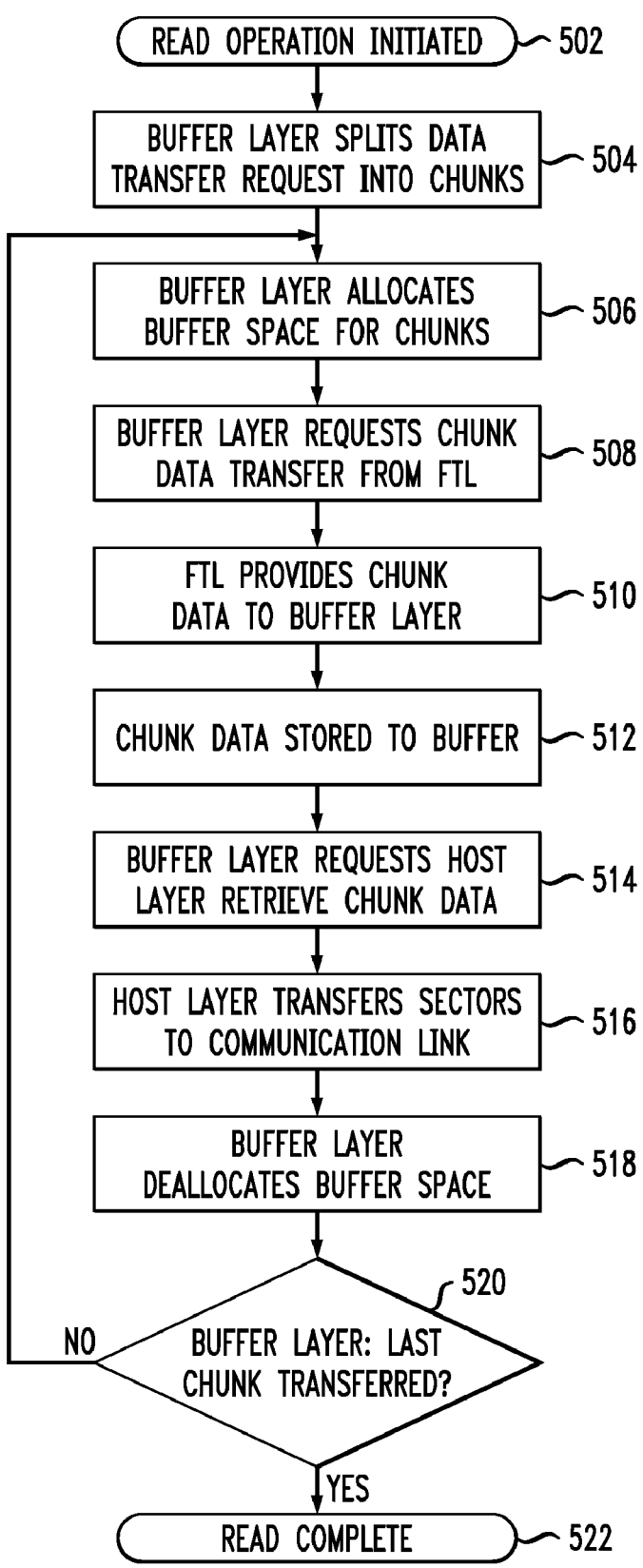
FIG. 5a shows a flow diagram of a media read operation performed by a buffer layer of the flash memory storage system of FIG. 1 operating in accordance with exemplary embodiments of the present invention.

FIG. 5a shows a system-level flow diagram of media read operation 500 performed generally by buffer layer 210 of flash memory storage system 100 of FIG. 1. As shown in FIG. 5a, media read operation 500 might be a request to read one or more contiguous addresses of flash media 118. Read requests for one or more non-contiguous addresses of flash media 118 might be processed substantially the same as shown in FIG. 5a, or, alternatively, read requests for non-contiguous addresses might be processed as described in related U.S. patent application Ser. No. 12/508,915. As shown in FIG. 5a, buffer layer 210 responds to a read request from host layer 202 at step 502. At step 504, buffer layer 210 might segment the read into smaller internal data transfers ("chunks"). Each chunk corresponds to a predefined number of LBAs ("sectors"). A starting LBA is retained with each chunk to identify the sectors corresponding to the chunk. A chunk boundary exists between the last LBA of one chunk and the first LBA of the next chunk. Embodiments of the present invention employ a chunk size that is substantially equal to the page size of flash media 118 (for example, $2^N$ bytes, where N is an integer). Thus, for example, a read operation might include multiple contiguous chunks (e.g. chunks having contiguous LBAs).

At step 506, buffer layer 210 allocates buffer space for one or more chunks in the current segment of the read operation for which data is to be read. Buffer layer 210 might allocate buffer space for the entire read and transfers all of the chunks from flash media 118. At step 508, buffer layer 210 requests data from FTL 208, corresponding to at least a portion of the data requested by the read request received at step 502, to be transferred from flash media 118. At step 510, FTL 208 provides the chunk data to buffer layer 210 and, at step 512, buffer layer 210 temporarily stores the data in buffer 114. At step 514, buffer layer 210 requests that host layer 202 retrieve the chunk data stored in buffer 114 at step 512. At step 516, host layer 202 transfers the chunk data to communication link 102. At step 518, buffer layer 210 deallocates the space in buffer 114 that was allocated in step 506 for the current group of one or more chunks. At step 520, if there are more chunks to transfer, processing returns to step 506 for buffer layer 210 to allocate buffer space for the next group of one or more chunks to be processed. If there are no more chunks to be transferred, processing continues to step 522, where the read operation ends.

As will be described in greater detail with regard to FIG. 7a, FIG. 7b and FIG. 8, embodiments of the present invention might perform host-side operations, for example steps 514 and 516 of FIG. 5a, for a first group of one or more chunks, and media-side operations, for example steps 508-512 of FIG. 5a, for a subsequent group of one or more chunks, in parallel. For example, by segmenting the read operation into chunks, a first set of chunks might be transferred between FTL 208 and buffer layer 210 (step 510), and host layer 202 might then transfer the first set of chunks to communication link 102 (step 516). Concurrently with one or more of the host-side operations for the first set of chunks, a second set of chunks for the same read operation might be transferred from FTL 208 to buffer layer 210 (step 510), and so on, until all chunks for the read operation are transferred. Thus, embodiments of the present invention provide the ability to perform host side and media side transfers in parallel.

Figure 5B:
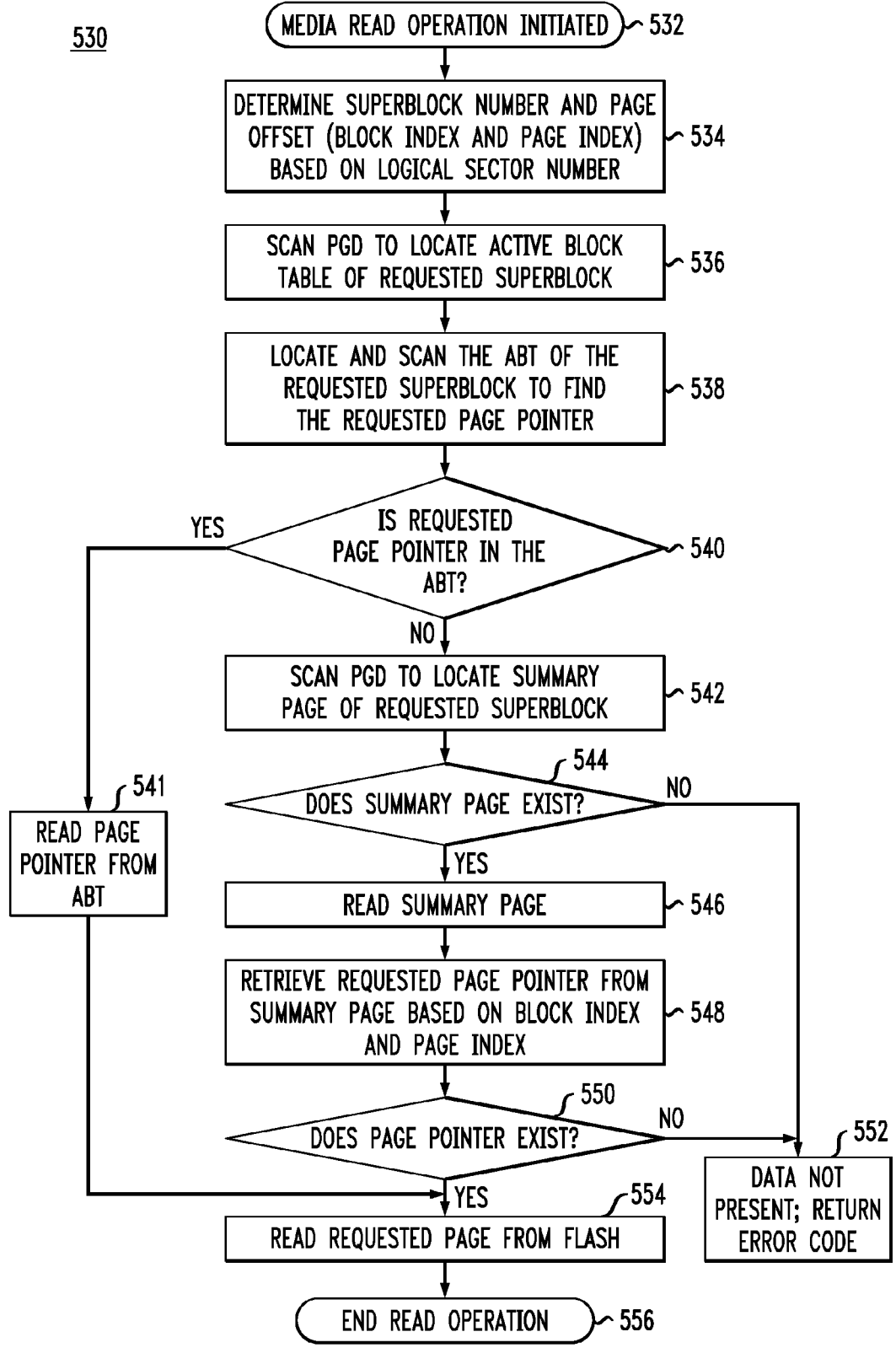
FIG. 5b shows a flow diagram of a media read operation performed at a flash translation layer of the flash memory storage system of FIG. 1 operating in accordance with exemplary embodiments of the present invention.

FIG. 5b shows a flow diagram of an exemplary flash media read operation 530 executed by FTL 208 (e.g. the media-side read operations at steps 508-512 of FIG. 5a). At step 532, the read operation is initiated, for example, in response to a flash media read request received from an external device coupled to communication link 102, as described with regard to FIGS. 1, 2 and 5a. As described with regard to FIG. 4a, the read request includes a logical block address (LBA) that FTL 208 translates into an actual address of the desired data at step 534. Thus, at step 534, FTL 208 determines the Superblock number, Block index and Page index of the first page to be read. At step 536, FTL 208 reads the Page Global Directory (e.g. PGD 430 of FIG. 4c) to read the Active Block Table pointer for the requested Superblock. At step 538, FTL 208 scans the ABT (e.g. ABT 440 of FIG. 4d) of the requested Superblock, in reverse order from most recent write to the first write of the active block, to determine if the requested page pointer is stored in the ABT (i.e. if the page was in the active block). At step 540, if the page pointer is stored in ABT 440, the page pointer is then read from the ABT at step 541, and the requested page is read from flash at step 554. If the page pointer is not in ABT 440, FTL 208 locates the summary page (e g summary page 420 of FIG. 4b) for the requested Superblock at step 542.

If, at step 544, no summary page exists for the requested Superblock, an error occurred and an error code or other predetermined data might be returned at step 552. If, at step 544, the summary page for the requested Superblock exists, at step 546 the summary page is read. The summary page can either be read from flash, or as described herein, from a cached copy of the summary page stored in RAM. At step 548, the pointer for the requested page is read from the summary page based on the Block Index and Page Index. At step 550, if the requested page pointer does not exist in the summary page, an error code or other predetermined data might be returned at step 552. At step 550, if the requested page pointer exists in the summary page, at step 554 FTL 208 reads the requested page from flash media 118, as described with regard to FIG. 2. As indicated by dashed lines 555 and 557, respectively, and as will be described in greater detail with regard to FIG. 5c, if additional pages remain to be read from flash, the process returns to step 534, otherwise, the read operation ends at step 556.

FIG. 5c shows a flow diagram of an exemplary flash media read operation 570 executed by host layer 202. As described previously with respect to FIG. 2, a host read request might request to read data from i) a single flash address (page), ii) multiple, sequential flash pages, or iii) multiple, non-sequential flash pages. As shown in FIG. 5c, at step 571, a host read operation is started. At step 572, a test determines whether the read operation is for multiple non-sequential pages (or a single page), or multiple sequential pages. If, at step 572, the read operation is for multiple non-sequential pages (or a single page), at step 574, host layer 202 requests that FTL 208 initiate media read operation 530 shown in FIG. 5b. At step 576, if the final page of the read operation was read, the read operation proceeds to step 586 and ends. Otherwise, if step 576 determines that the final page was not read, indicating that the read operation has non-sequential pages remaining to be read, at step 578, the next LBA is retrieved, and processing returns to step 574 to read the next address. If, at step 572, the read operation is for multiple sequential pages, then, at step 580, host layer 202 requests that FTL 208 initiate media read operation 530 shown in FIG. 5b. At step 582, if there are additional pages of the read request remaining to be read, the page offset is incremented at step 584 and the next page is read by FTL 208 at step 580, and so on, until the last requested page has been read. At step 582, if the last requested page has been read, at step 586 the read operation ends.

Thus, as shown in FIGS. 5b and 5c, for a read operation, at most, two flash media read operations occur per each requested address: i) if the summary page data is not cached in RAM, the summary page is read from flash (e.g. step 546), and ii) the actual data location is read from flash (e.g. step 554). For a sequential read operation, this process is simplified. For the first page of a sequential read, at most, two flash media read operations occur per address: i) if the summary page is not cached in RAM, the summary page is read from flash (e.g. step 546), and ii) the actual data location is read from flash (e.g. step 554). For subsequent pages of the sequential read operation, the page address might simply be incremented (e.g. step 584) to read the next page from flash (e.g. step 580).

Figure 6A:
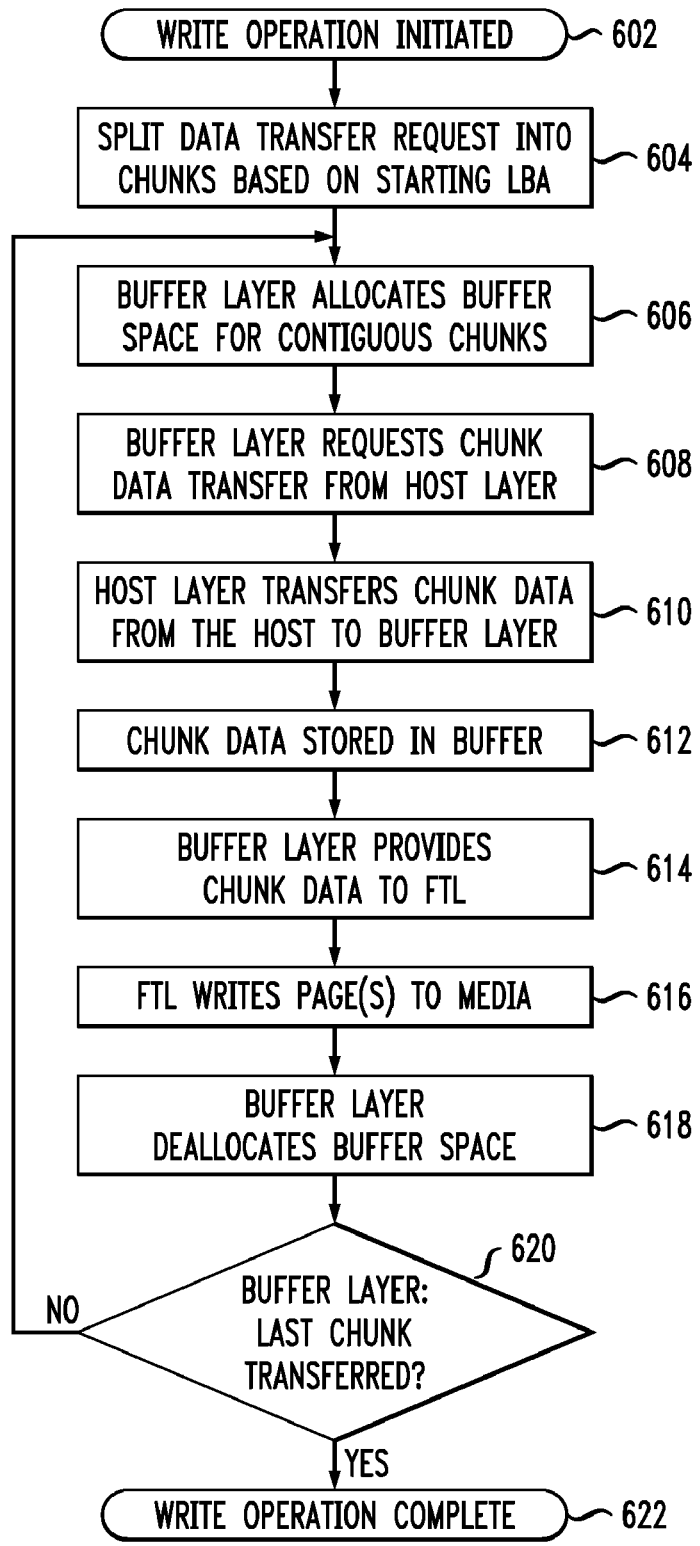
FIG. 6a shows a flow diagram of a media write operation performed by a buffer layer of the flash memory storage system of FIG. 1 operating in accordance with exemplary embodiments of the present invention.

FIG. 6a shows a flow diagram of a media write operation performed generally by buffer layer 210 of flash memory storage system 100 of FIG. 1. As shown in FIG. 6a, media write operation 600 might be a request to write one or more contiguous addresses of flash media 118. Write requests for one or more non-contiguous addresses of flash media 118 might be processed substantially the same as shown in FIG. 6*a*, or, alternatively, write requests for non-contiguous addresses might be processed as described in related U.S. patent application Ser. No. 12/508,915. As shown in FIG. 6*a*, at step 602, host layer 202 (FIG. 2) responds to a write request from communication link 102. At step 604, buffer layer 210 groups the sectors of the write operation into chunks based on the starting LBA. At step 606, buffer layer 210 allocates buffer space for chunks of the write operation being processed. At step 608, buffer layer 210 requests the data for the current chunks from host layer 202. At step 610, host layer 202 transfers the chunk data to buffer layer 210, and, at step 612, buffer layer 210 stores the chunk data in buffer 114.

At step 614, buffer layer 210 provides data for the one or more chunks to FTL 208. At step 616, FTL 208 writes one or more pages of the chunk data to flash media 118. At step 618, buffer layer 210 deallocates the space in buffer 114 allocated at step 606 for the current chunks. At step 620, if there are additional chunks having data to be written, processing returns to step 606. If there are no additional chunks to be written, at step 622, the write operation is ended. As described above with regard to the read operation of FIG. 5*a*, and as will be described in greater detail with regard to FIG. 7*a*, FIG. 7*b* and FIG. 8, embodiments of the present invention might perform host-side operations, for example steps 608-612 of FIG. 6*a*, for a first group of one or more chunks, and media-side operations, for example steps 616 and 618 of FIG. 6*a*, for a subsequent group of one or more chunks, in parallel.

Figure 6B:
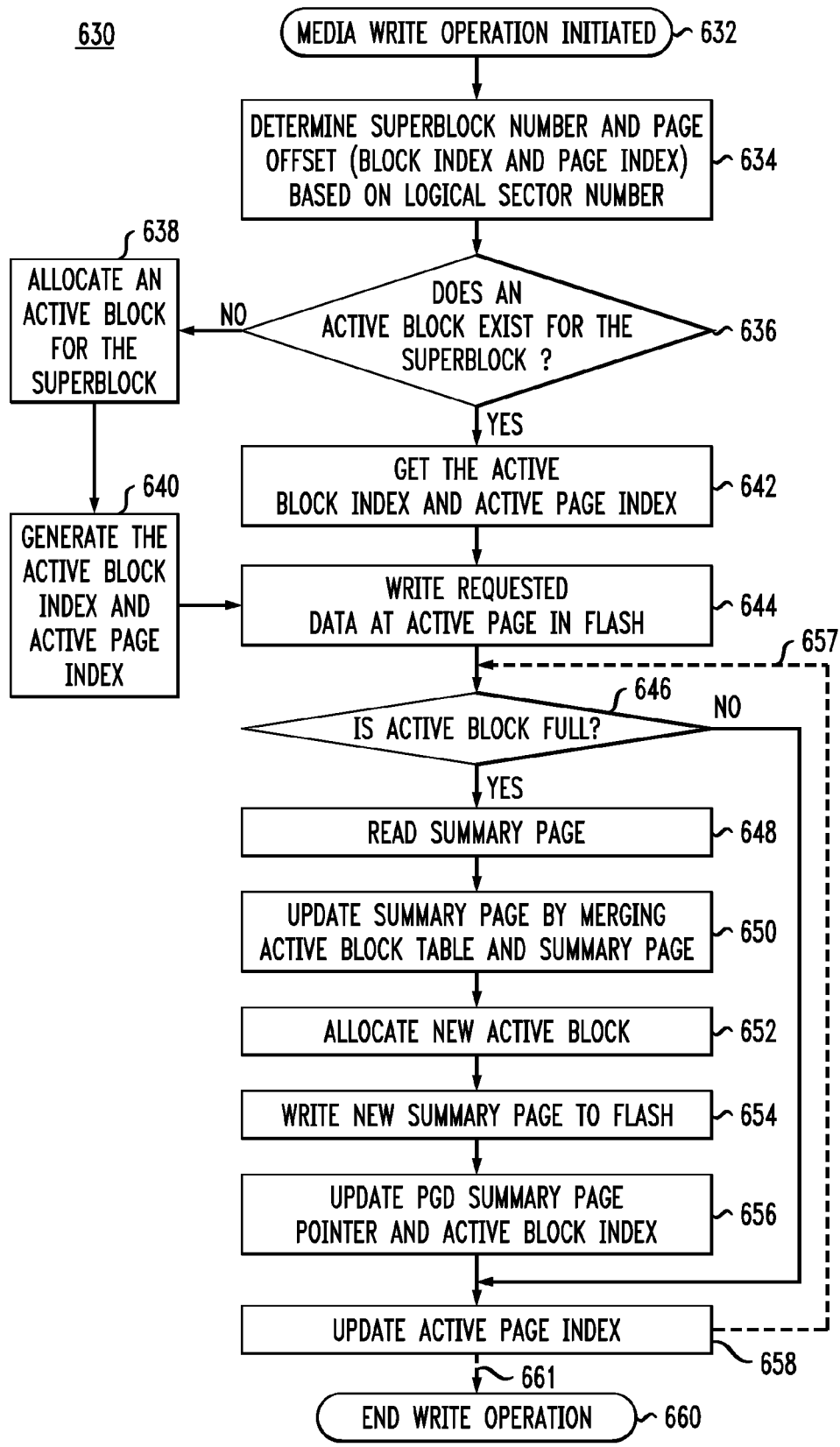
FIG. 6b shows a flow diagram of a media write operation performed at a flash translation layer the flash memory storage system operating in accordance with exemplary embodiments of the present invention.

FIG. 6*b* shows a flow diagram of an exemplary flash media write operation 630 executed by FTL 208 (e.g. the media-side write operations at step 616 of FIG. 6*a*). At step 632, a write operation is initiated, for example, in response to a flash media write request received from an external device coupled to communication link 102. As described with regard to FIG. 4, the write request includes a logical block address (LBA) that FTL 208 translates into an actual address of the data at step 634. Thus, at step 634, FTL 208 determines the Superblock number, Block index and Page index of the first page to be written. At step 636, FTL 208 determines if an Active Block exists for the requested Superblock by scanning the PGD (e.g. PGD 430 of FIG. 4*c*). If an Active Block does not exist, such as, for example, if there is no entry for the Superblock in the PGD, then at step 638 a new active block is allocated for the Superblock from a pool of free blocks within the wear-level unit. At step 640, the Active Block index and Active Page index are stored to the PGD entry associated with the requested Superblock. If an Active Block does exist, at step 642, the block index and the page index of the Active Block are retrieved from the PGD. Once the block index and page index of the Active Page are determined, the requested data is written at the active page address at step 644.

At step 646, if the Active Block is not full (or if the number of written pages in the Active Block is below a threshold), then, at step 658, the active page index is updated to point to the next free page in the active block and is stored to the PGD. If, at step 646, the Active Block is full (or if the number of written pages in the Active Block is above a threshold), a new active block might be allocated and the process advances to step 648. At step 648, the summary page for the Superblock containing the active block is read. The summary page can either be read from flash, or as described herein, from a cached copy of the summary page stored in RAM. If a summary page for the Superblock containing a newly allocated active block does not exist, a new summary page is allocated. At step 650, the data from the summary page and the active block table is merged to create an updated summary page. FTL 208 allocates a new active block for the Superblock at step 652 and writes a new summary page for the Superblock to flash at step 654. At step 656, FTL 208 updates the Page Global Directory (e.g. PGD 430 of FIG. 4*c*) to point to the new summary page and the new active block for the Superblock. Then, at step 658, the written page offset is stored in ABT 440, and the current active page and the active block are stored in PGD 430. The next active page is the current page incremented by one, or page 0 of the next sequential block.

As indicated by dashed line 657, steps 646 through 658 could be repeated if the Active Block of the summary page superblock also happened to become full at the same time. For example, a write operation occurs and the active block is full, as described previously. Upon updating the summary page at step 654, the active block of the summary page superblock could become full. In that instance, steps 646 through 658 would be repeated to allocate a new active block for the summary page superblock. Otherwise, as indicated by dashed line 661, the media write operation ends at step 660.

FIG. 6*c* shows a flow diagram of host write operation 663 executed by host layer 202. As described herein, a host write request might request to write data to i) a single flash page, ii) multiple, sequential flash pages, or iii) multiple, non-sequential flash pages. As shown in FIG. 6*c*, at step 664 a host write operation is started. At step 665, a determination is made as to whether the write operation is for multiple non-sequential pages (or a single page), or multiple sequential pages. If, at step 665, the write operation is for multiple non-sequential pages (or a single page), then, at step 666, host layer 202 requests that FTL 208 initiate media write operation 630 shown in FIG. 6*b*. After each page is written, at step 668, if it is determined that the final page of the write operation has been written, the host write operation ends at step 675. If, at step 668, the write operation has non-sequential pages remaining to be written, then, at step 670, the next LBA is retrieved, and processing returns to step 666 to write the next address.

If, at step 665, the write operation is for multiple sequential pages, then, at step 671 host layer 202 requests that FTL 208 initiate media write operation 630 shown in FIG. 6*b*. At step 672, if there are additional pages of the write request remaining to be written, the page offset is incremented at step 673 and the process returns to step 671 to write the next page, and so on, until the last page has been written. At step 672, if the last page was written, at step 675 the write operation ends.

As shown in FIGS. 6*b* and 6*c*, in general write operations require only a single flash operation (writing to the active block). The active block data might be recovered from ABT 440, which is stored in RAM. If the active block being written becomes full, additional steps for updating the mapping data (e.g. step 667 or step 674) might require flash media accesses, for example, to: i) read the summary page from flash (e.g. step 648), ii) write a new summary page to flash (e.g. step 654), iii) update the page global data for the superblock (e.g. step 656).

Figure 6D:
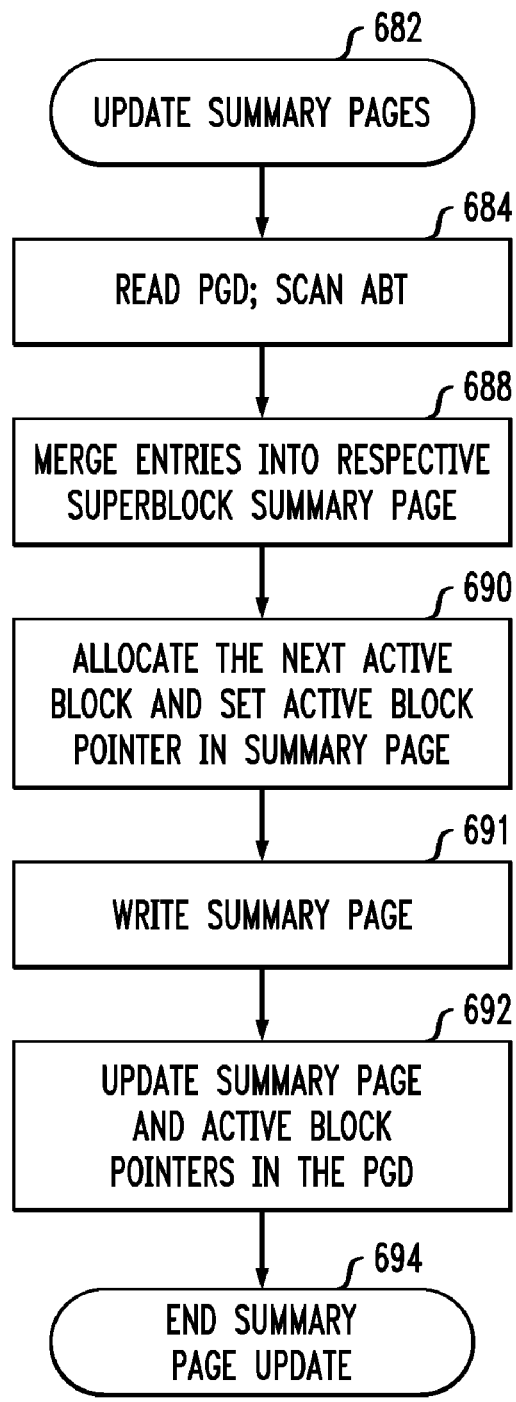
FIG. 6d shows a flow diagram of a summary page update routine in accordance with exemplary embodiments of the present invention.

In embodiments of the present invention, the summary pages for each Superblock might be periodically updated, for example, during idle time of flash memory storage system 100. As described with regard to FIG. 4*d*, ABT 440 might be employed to buffer mapping data for flash media write operations that are completed between updates of the summary pages. FIG. 6*d* shows a flow diagram of exemplary summary page update routine 680 executed by FTL 208. Summary page update routine 680 might be performed when ABT 440 becomes full (or is filled more than a predetermined threshold). At step 682, update summary page routine 680 is initiated by FTL 208. At step 684, FTL 208 reads the Page Global Data (e.g. PGD 430 of FIG. 4*c*) and the Active Block Table (e.g. ABT 440 of FIG. 4d). ABT 440 might be written in one order (e.g. top-down) and read in the opposite order (e.g. bottom-up), generally forming a last-in, first-out (LIFO) buffer. By reading ABT 440 in the opposite order it is written, in the event that a certain block is written multiple times before the summary page is updated, FTL 208 only updates the summary page once for every full block, avoiding multiple updates of the same summary page for stale data. FTL 208 might scan the entries of ABT 440, for example, sequentially from the highest indexed Superblock to the lowest indexed Superblock, to determine if ABT 440 contains data for one or more Superblocks that are more recent than summary page(s) for the Superblock(s). PGD 430 is read by Superblock number.

At step 688, FTL 208 merges the entries of ABT 440, PGD 430 and summary page 420 for any Superblocks determined to have summary pages that are out-of-date. By merging the ABT entries, PGD entries and summary page entries, FTL 208 creates a new, up-to-date summary page for the Superblock(s). At step 690, a new active block is allocated, and the active block pointer in the summary page (e.g. pointer 425) is updated. At step 691, the new summary page is written. At step 692, the map page (i.e. the summary page for the map Superblock) is updated to include the new page addresses for the summary page and the summary page pointer and active block pointer are updated in PGD 430. At step 694, all mapping data has been updated and summary page update routine 680 is ended.

The frequency with which FTL 208 performs periodic summary page update routine 680 is generally a tradeoff between the number of write operations to flash media 118 and the amount of RAM (e.g. buffer 114) needed to store ABT 440. The more frequently the summary pages are updated, the more write operations are performed and the less RAM is needed to store ABT 440. The less frequently the summary pages are updated, the fewer write operations are performed and the more RAM is required to store ABT 440. The fewer write operations are performed, the fewer erase operations are performed, potentially extending the operating life flash media 118, but requiring more RAM. Embodiments of the present invention provide that the summary page update frequency might be a user selectable setting of flash memory controller 104. Alternatively, at system startup, flash memory controller 104 might automatically detect the amount of RAM available (for example, the size of buffer 114) and configure ABT 440 to a default size.

Although an HDD controller might generally access a single HDD serially, an SSD controller, such as flash controller 104 of FIG. 1, might access one or more flash devices in parallel, shown in FIG. 3 as flash dies 304(1)-304(N). In some instances, large data transfers might span multiple of the flash dies 304(1)-304(N). Embodiments of the present invention divide data transfers internally into smaller segments ("chunks") and employ one or more virtual circular buffers to facilitate parallel processing of host-side and media-side data transfers.

Figure 7A:
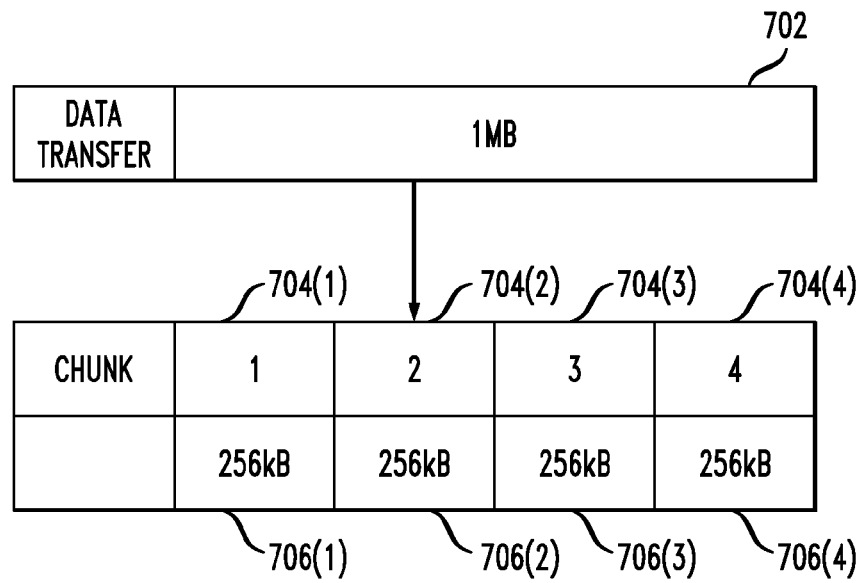
FIG. 7a shows a block diagram of internal segmentation of large data transfers employed by the flash memory storage system of FIG. 1.

FIG. 7a shows an exemplary data transfer, 702, for 1 MB of data. Data transfer 702 might be a host-side data transfer (e.g. a flash write operation) of data to be written from a device coupled to communication link 102 (FIG. 1) to flash media 118, or data transfer 702 might be a media-side data transfer (e.g. a flash read operation) of data read from flash media 118 to be provided to one or more devices coupled to communication link 102. For data transfers larger than a predetermined threshold, buffer layer 210 (FIG. 2) might segment host-side media request 702 into smaller into smaller internal data transfers. For the example of FIG. 7a, buffer layer 210 might split data transfer 702 into four smaller data transfers shown as chunks 704(1)-704(4). As shown in the example of FIG. 7a, the predetermined threshold is 256 kB, thus, data transfer 702 is divided into four 256 kB chunks, but other threshold values might be employed. As shown, each of chunks 704(1)-704(4) corresponds to 256 kB segments 706(1)-706(4) of data transfer 702. The maximum size of the chunks is determined by the size of the physical buffers, shown in FIG. 7b.

Figure 7B:
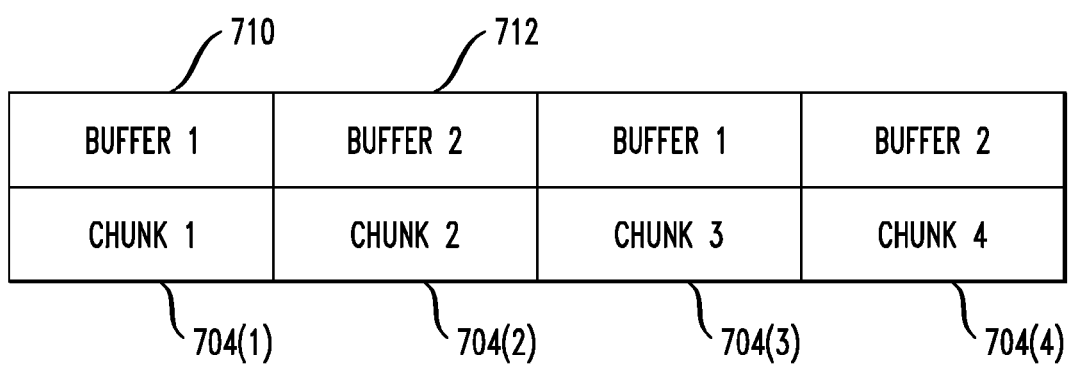
FIG. 7b shows a virtual circular buffer employed for media read and media write operations in accordance with exemplary embodiments of the present invention.

FIG. 7b shows exemplary virtual circular buffer 700. Virtual circular buffer 700 might be controlled by buffer layer 210 (FIG. 2), and might be located in at least one of internal RAM buffer 112 and external RAM buffer 114 (FIG. 1). As shown, virtual circular buffer 700 might include two physical buffers, shown as buffer1 710 and buffer2 712. In embodiments of the present invention, the number of physical buffers employed by virtual circular buffer 700 might be selectable. For example, if flash controller 104 is under relatively low workload for large data transfers, buffer layer 210 might allocate an additional physical buffer (for example, a "buffer3") to virtual circular buffer 700. The advantage of allocating an additional physical buffer is higher utilization of the buffer hardware (FIG. 1) and software engines (FIG. 2). Buffer1 710 and buffer2 712 are configured to temporarily store data chunks 704(1)-704(4) as described subsequently.

Figure 8:
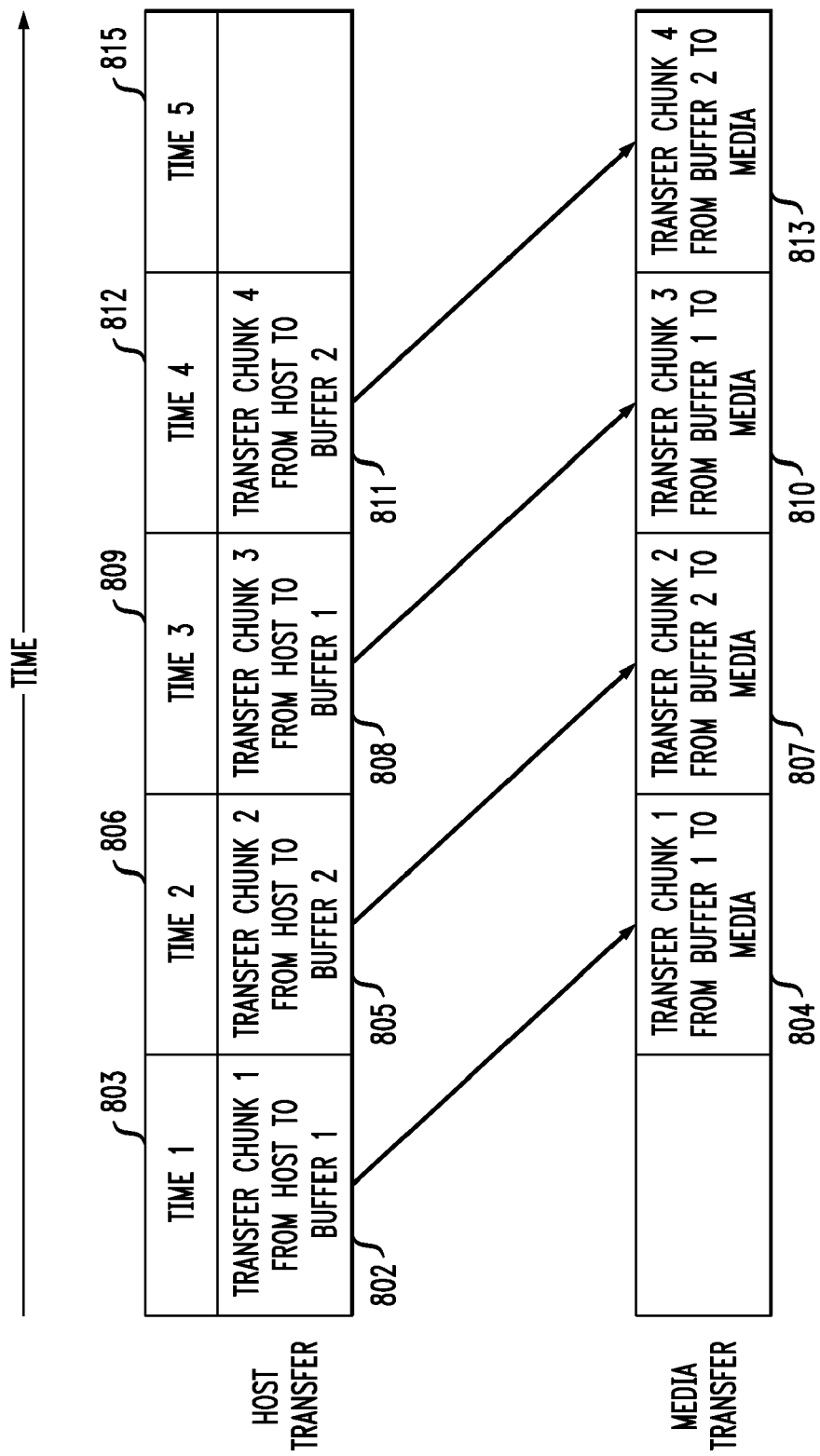
FIG. 8 shows a timing diagram of a media write operation employing the buffer of FIG. 7b.

FIG. 8 shows a timing diagram of a write operation employing virtual circular buffer 700. As host transfer 802 provides chunk1 704(1) to buffer1 710 at time1 803, media transfer 804 is queued for chunk1 704(1). At time2 806, when the host transfer for chunk1 704(1) is complete, media transfer 804 starts providing chunk1 704(1) to flash media 118 (FIG. 1). In parallel with media transfer 804, host transfer 805 for the next chunk, chunk2 704(2), is provided to buffer2 712. When media transfer 804 is complete, buffer1 710 is freed to receive the next chunk, chunk3 704(3), by host transfer 808 at time3 809. In parallel with host transfer 808, once host transfer 805 is complete, media transfer 807 provides chunk2 704(2) to flash media 118, and so on, until all chunks of the data transfer are processed.

In some embodiments of the present invention, a physical buffer (e.g. buffer1 710 and buffer2 712) is reused within virtual circular buffer 700 as soon as the buffered data is transferred to its destination (for example, flash media 118 in the example of FIG. 8). This minimizes the effect of large data transfers on the buffer space available in buffers 112 and 114 for other operations of flash controller 104. Alternatively, flash controller 104 might be configured to replace the physical buffers of virtual circular buffer 700 with alternate physical buffers in between handling of chunks for a large data transfer. This might allow buffer layer 210 flexibility in configuring and allocating buffer space such as, for example, selectably increasing or decreasing the number of physical buffers for a virtual circular buffer, as described with regard to FIG. 7b.

Embodiments of the present invention provide multiple virtual circular buffers (e.g. virtual circular buffer 700 of FIG. 7b) operating simultaneously to support parallel processing of multiple large data transfers. For example, referring back to FIG. 3, buffer layer 210 employing N virtual circular buffers allows processing of multiple large data transfers in parallel because data is transferred in parallel between the N virtual circular buffers and the N flash dies 304(1)-304(N). Further, the number of virtual circular buffers in operation might be selectable by buffer layer 210. For example, if flash controller 104 is under a heavy workload for large data transfers, buffer layer 210 might allocate an additional virtual circular buffer to provide parallel processing of the large data transfers. Virtual circular buffers are useful for skip-read and skip-write operations, such as described in related U.S. patent application Ser. No. 12/508,915. Virtual circular buffers are also useful in performing data transfers across logical partition boundaries (e.g. Superblock boundaries).

On startup of flash memory storage system 100, mapping data stored in volatile memory (e.g. RAM buffers 112 and 114) requires reconstruction. The reconstruction process is desirably completed quickly to allow access of flash media 118. For example, ABT 440 is stored in RAM, and is reconstructed on startup to allow access of flash media 118. FIG. 9 shows a flow diagram of map data reconstruction 900. At step 902, FTL 208 initiates reconstruction 900, for example, on startup of flash memory storage system 100. At step 903, FTL 208 requests that buffer layer 210 allocate space in RAM (e.g. at least one of buffer 112 and buffer 114 of FIG. 1) for ABT 440, which is initialized to predetermined default values. At step 904, FTL 208 scans the blocks within each Superblock of each wear-level unit and groups the blocks based on block type. Step 904 will be described in greater detail with regard to FIG. 10*a*. At step 906, FTL 208 processes the grouped blocks and updates the corresponding mapping data structures (e.g. the data structures of FIGS. 4*a-d*). Step 906 will be described in greater detail with regard to FIG. 11. At step 908, if additional blocks remain to be scanned and processed, processing continues to step 910 where the block index is incremented and the next block is scanned at step 904. This continues until, at step 908, FTL 208 determines that all the blocks of flash media 118 have been scanned and processed, in which case, processing advances to step 912. At step 912, FTL 208 determines if any blocks did not appear the ABT, the summary pages, or the bad block list. For the described embodiment, blocks that did not appear in these data structures are presumed to have been in queue for erasure at the last power down. Thus, at step 914, these blocks are again placed in the queue for erasure. If, at step 912, no blocks need to be queued for erasure or, after step 914 when blocks are placed in the queue, processing continues to step 916 where the reconstruction operation is complete.

Figure 10A:
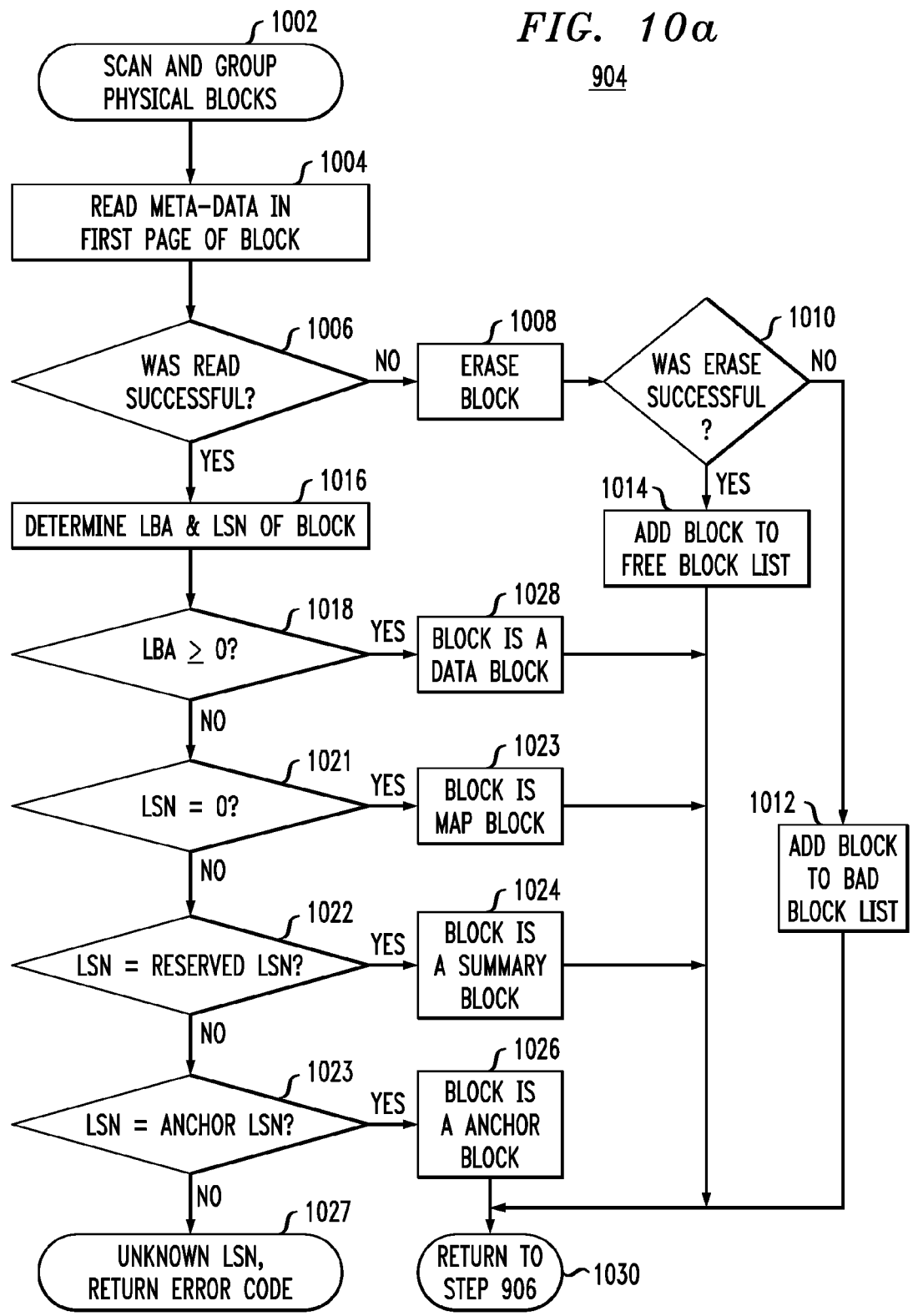
FIG. 10a shows a flow diagram of a scan and group blocks sub-routine of the logical-to-physical translation table reconstruction operation of the exemplary embodiment of FIG. 9.

FIG. 10*a* shows an exemplary flow diagram of step 904 of the reconstruction process of FIG. 9, which performs the scan and group blocks sub-routine. In general, there are six possible categories for blocks to be grouped into: i) anchor blocks, ii) map blocks, iii) summary blocks, iv) data blocks, v) free blocks and vi) bad blocks. At step 1002, scan and group blocks sub-routine 904 is initiated. At step 1004, FTL 208 reads metadata that is stored in the spare area of the first page of the block. As described herein, this metadata might include the host LBA and media LSN corresponding to the block, the wear-level unit number corresponding to the block, a block type of the block, and the sequence number corresponding to the block. At step 1006, if the read of metadata at step 1004 is unsuccessful, processing continues to step 1008.

At step 1008, FTL 208 erases the block. At step 1010, if the erase of the block was successful, the block is then added to the free block list at step 1014. As described herein, blocks in the free block list might be allocated by FTL 208 as Update Blocks to a Superblock when additional data blocks are required to support write operations. If the erase of the block was unsuccessful, the block cannot be erased and has failed. In general, with flash memory devices, after a successful erase operation, all the bits of the block are set to logic 1. A failed erase operation might be detected if the block is read and one or more bits within the block are not set to logic 1. At step 1012, if the erase of the block was unsuccessful, the block address is added to the bad block list (e.g. bad block list 428 of FIG. 4*d*) corresponding to the wear-level unit containing the Superblock. Additionally, FTL 208 might attempt to write a bad block indicator flag in the spare area of one or more pages of the failed block. After the bad block list is updated, processing continues to step 1030 where the scan and group blocks sub-routine is ended and processing returns to step 906 of FIG. 9.

At step 1006, if the read of metadata at step 1004 is successful, processing continues to step 1016. At step 1016, the host LBA and the media LSN of the block are determined, for example, from the metadata read at step 1004. At step 1018, if the host LBA of the block is greater than or equal to 0, then the process continues to step 1028 where the block is determined to be a data block. If, at step 1018, the host LBA is not greater than or equal to 0, then the block might be an anchor block, a summary block, or the map block.

Figure 10B:
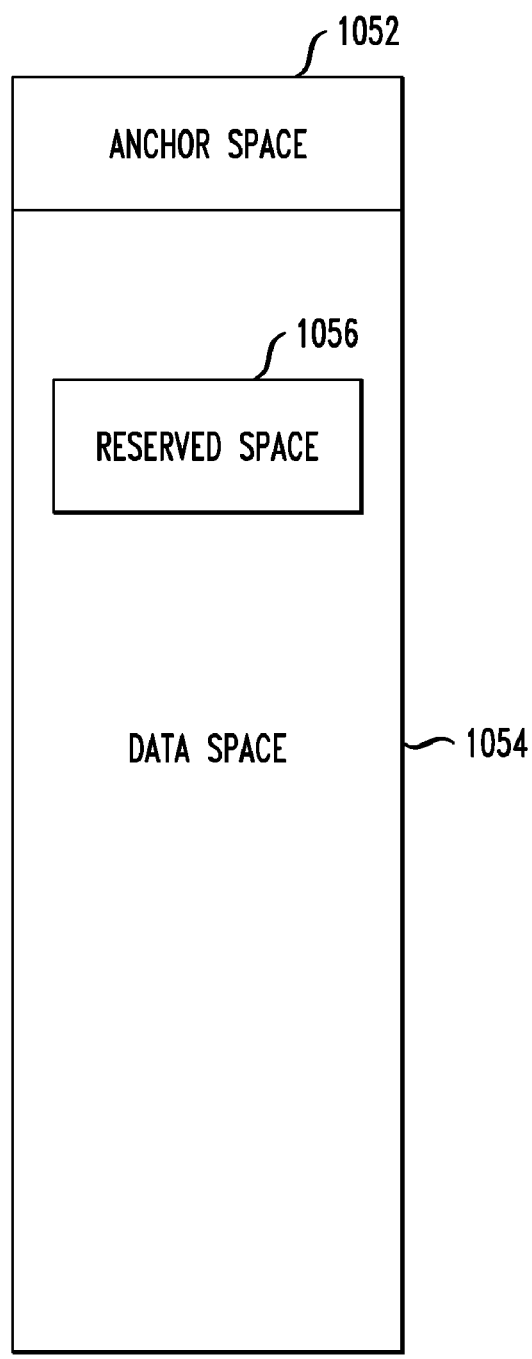

For example, as shown in FIG. 10*b*, flash media 118 might be divided into one or more separate physical spaces, shown as anchor space 1052 and data space 1054. Anchor space 1052 contains data that must be stored in particular physical blocks (anchor blocks), thus, the blocks are "anchored" in a particular physical position in flash media 118. Anchor blocks might store at least a portion of the software or firmware for flash controller 104, or might store configuration files or other data required by flash controller 104 at power up. As described herein, the first block (block 0) of a flash die is generally provided from the manufacturer error-free, and might generally be used as an anchor block. Data space 1054 holds all other data, including user data (data blocks) and mapping data. Mapping data, such as the map block and summary blocks, might be stored in reserved space 1056, which is one or more segments of data space 1054 that are reserved for storing mapping data. Reserved space 1056 is not accessible by host requests (e.g. host read and write requests). In exemplary embodiments of the present invention, reserved space 1056 is placed immediately after anchor space 1052, or at the end of data space 1054. Since they are not accessible by the host, blocks in anchor space 1052 and reserved space 1056 generally might not have corresponding host LBAs.

Referring back to FIG. 10*a*, if, at step 1018, the host LBA was not greater than or equal to 0, then at step 1021, if the LSN is equal to 0, the block is determined to be a map block at step 1023. The map block is the location of the map page (i.e. the block reserved for storing the summary page of the summary page Superblock, as described with regard to FIG. 4*d*). As described herein, in some embodiments of the present invention, the map page might be stored in the first block after the anchor blocks such that the map page can always be located by FTL 208, even if mapping data has been corrupted. If the LSN is greater than 0, processing continues to step 1022, where, if the LSN is equal to an LSN in the reserved Superblock(s), then at step 1024 the block is determined to be a summary block (i.e. a block reserved for storing summary pages of data Superblocks).

If, at step 1022, the LSN was not equal to a reserved LSN, at step 1023 the LSN of the block is checked against the LSNs of anchor space 1052. If, at step 1023 the LSN of the block is equal to an LSN in the anchor space, at step 1026, the block is determined to be an anchor block. If, at step 1023, the LSN was not recognized by FTL 208, at step 1027, an error code might be generated and flash controller 104 might perform subsequent processing. Once the block type is determined, for example, by one of steps 1012 (bad block), 1014 (free block), 1020 (anchor block), 1023 (map block), 1024 (summary block), and 1028 (data block), processing continues to step 1030, where scan and group blocks sub-routine 904 is ended and processing returns to step 906 of FIG. 9.

Alternative embodiments of the present invention might simplify the block type determination. As described herein, metadata might be stored in the spare area of the first page of each block. Exemplary embodiments of the present invention might store a block type field in the metadata. This block type field might include a code to indicate that the corresponding block is one of i) a bad block, ii) an anchor block, iii) a reserved block, iv) a summary block, v) a map block, vi) a data block, and vii) an erased block. This block type metadata field might be stored each time a block is written. For example, flash memory storage system 100 might be initially programmed with firmware during a manufacturing process. During this initial programming, as blocks used to store elements of the firmware are written, the corresponding block type field might be written to indicate that these blocks are anchor blocks. During initial programming, one or more reserved areas of media 118 might be determined, and the block type field for these blocks might be set to indicate that the blocks are reserved. Similarly, during initial programming, if any bad blocks are detected, the corresponding block type field might be set to indicate that the block is bad. After initial programming during manufacturing, the block type field for all other blocks might be set to indicate that the blocks are erased. These erased blocks are available for subsequent use by flash memory storage system 100, and as each block is written as summary blocks or data blocks, or as each block is subsequently erased, the corresponding block type field might be updated accordingly.

FIG. 11 shows a flow diagram of the process blocks and update data structures sub-routine performed at step 906 of the reconstruction process of FIG. 9. In embodiments of the present invention, process blocks and update data structures sub-routine 906 might not be performed until the block types of all blocks have been determined. At step 1102, process blocks and update data structures sub-routine 906 is initiated. At step 1104, if the block being processed by FTL 208 was determined to be a summary block in step 904 of FIG. 9, processing continues to step 1106. At step 1106, the first page of the summary block is scanned to determine the sequence number associated with the page and the Superblock associated with the page. As described herein, the sequence number might represent the order in which FTL 208 allocated blocks to the Superblock and wrote the pages of the block. At step 1108, the sequence number of the block is compared to the sequence number of the active block stored in Page Global Directory (PGD) 430 that was created at step 903 of FIG. 9 and is initialized to predetermined default values. If the sequence number of the summary page stored in PGD 430 is greater than or equal to the sequence number of the page read at step 1106, at step 1110 PGD 430 is up-to-date, and the process continues to step 1114. If, at step 1108, the sequence number of the summary page stored in PGD 430 is less than the sequence number of the page read at step 1106, at step 1112 PGD 430 is updated to point to the page index of the more recently written summary page data, and the process continues to step 1114. At step 1114, if the last written page of the current block has not been scanned, at step 1116 the page index is incremented and the process returns to step 1106 to scan the next page. The process continues until the last written page has been scanned. At step 1114, if the last written page of the current block has been scanned, at step 1142, the process returns to step 908 of FIG. 9.

If, at step 1104, the block is not a summary block, processing continues to step 1118. At step 1118, if the block being processed by FTL 208 in step 904 of FIG. 9 is a data block, the process continues to step 1120. At step 1120, if the current block is not the active block of the Superblock, processing might continue to step 1106, and the PGD might be updated similarly as described for a summary block. At step 1120, if the current block is the active block of the Superblock, the process continues to step 1122. At step 1122, the active block is scanned sequentially to find the last written page of the active block. At step 1124, the page offsets stored in ABT 440 are updated to reflect the order of writes to the active block, at step 1126, the page offsets stored in ABT 440 are up-to-date, and the process continues to step 1130.

At step 1130, FTL 208 checks to see if the active block is full, or if the amount free pages left in the active block has reached a minimum threshold. At step 1130, if the Active Block is full (or if the number of written pages in the Active Block is above a threshold), a new active block is allocated at step 1132, similarly as described with regard to FIG. 6b. At step 1134, FTL 208 updates the summary page (e.g. summary page 420 of FIG. 4b) for the Superblock associated with the active block, similarly as described with regard to FIGS. 6b and 6d. At step 1136, FTL 208 updates the active block table (e.g. ABT 440 of FIG. 4d) to point to the new active block allocated at step 1132 and also updates PGD 430 (FIG. 4c) such that ABT pointer 436 points to the new active block allocated at step 1132. Then, at step 1142, sub-routine 906 ends and the process returns to step 908 of FIG. 9. At step 1130, if the active block is not full, the process continues to step 1142, where sub-routine 906 ends and the process returns to step 908 of FIG. 9.

At step 1138, if the block being processed by FTL 208 in step 904 of FIG. 9 is the map block, the process continues to step 1140. At step 1140, FTL 208 locates the last written page of the map block to locate the most recent map page in order to locate the most recent location of the summary pages for each Superblock. Once the last written page of the map block is located at step 1140, PGD 430 is updated to point to the current location of the map page at step 1141. If, at step 1138, the block is either a free block or a bad block, the sub-routine of step 906 ends at step 1142, where the process returns to step 908 of FIG. 9.

Embodiments of the present invention provide for at least one of RAM buffer 112 and RAM buffer 114 to act as a read/write data cache for data being transferred between media 118 and communication link 102. In general, an efficient hash table might be configured such that the memory allocated to it is approximately double the number entries expected to be stored in the hash table because there are diminishing returns for maintaining a larger hash table with a limited number of entries. Further, as described herein, embodiments of the present invention might configure RAM buffers 112 and 114 to store, for example, PGD 430 or to cache recently accessed summary pages for faster access. However, hash tables generally are set to a fixed size at the compile time of the software/firmware operating on flash controller 104. Embodiments of the present invention provide dynamic sizing of hash tables, for example a hash table used to track the contents of the data cache, during operation of flash memory controller 104.

FIG. 12 shows a flow diagram of hash table size update operation 1200. At step 1202, buffer layer 210 (FIG. 2), which manages buffers 112 and 114, initiates hash table size update operation 1200. For example, buffer layer 210 might run hash table size update operation 1200 at startup of flash memory controller 104 or if the number of items tracked in the cache hash table changes during operation of flash memory controller 104. In embodiments of the present invention, the cache hash table tracks a number of data chunks allocated to the cache, and hash table size operation 1200 is performed when there is a change in the number of chunks tracked in the cache hash table. A change in the number of chunks allocated to the cache, and thus tracked in the cache hash table, might occur when flash media 118 is formatted.

Hash table size update operation 1200 might beneficially be performed during operation of flash memory controller 104 since the size of external RAM buffer 114 might not be a known, fixed value at the compile time of software running on flash memory controller 104. For example, the size of RAM buffer 114, and thus the amount of RAM available to store the cache and the cache hash table, might differ depending on the needs of end users of flash memory controller 104. Additionally, as described herein, embodiments of the present invention might employ different sector sizes of flash media 118 depending on the desired use of flash memory controller 104. Thus, the sector size of flash media 118 might not be a known, fixed value at the compile time of software running on flash memory controller 104, since the sector size might be changed if flash media 118 is re-formatted. Changes in sector size formatting of flash media 118 correspond to changes in the number of data chunks allocated to the cache and tracked by the cache hash table.

At step 1208, buffer layer 210 determines the number of items being managed in the cache hash table, for example, by scanning the cache or, alternatively, FTL 208 might communicate to buffer layer 210 a desired number of items to be cached (e.g., the number of chunks allocated to the cache). As described herein, the cache hash table might track a number of data chunks allocated to the cache, and the LBA ranges of data chunks stored in the cache. At step 1212, if the number of actual or desired number of cache items has reached a threshold, at step 1214 buffer layer 210 sets the size of the cache hash table to a corresponding higher value, as will be described with regard to FIG. 13, and the process continues to step 1220. If, at step 1212, the number of actual or desired number of cache hash table items has not reached a maximum threshold, at step 1218, buffer layer 210 sets the size of the cache hash table to a corresponding lower value, as will be described with regard to FIG. 13, and the process continues to step 1220. Once the size of the cache hash table is set, for example by one of steps 1214 (higher value) or 1218 (lower value), cache hash table size update operation 1200 is complete at step 1220. Thus, in comparison to a fixed-size cache hash table at software/firmware compile time, the cache hash table resize threshold might be a fixed value at compile time and the cache hash table itself might be resized as needed during the operation of flash memory controller 104.

FIG. 13 shows an exemplary chart, 1300, of i) the actual size and ii) the number of items stored in an exemplary cache hash table as dynamically managed by cache hash table size update operation 1200. As described herein, an efficient hash table desirably is approximately double the size of the number of items stored in the table, although other sizes might be employed (e.g., triple or quadruple the number of items). Further efficiency might be gained for indexing the hash table if the total size is a power of 2. Embodiments of the present invention might set the cache hash table size (e.g., at steps 1214 and 1218 of FIG. 12) equal to two times the number of items stored in the hash table, rounded up or down to the nearest power of 2. For example, if 25 chunks are allocated to the cache, the cache hash table will store tracking data corresponding to each of the 25 chunks. A hash table size might beneficially be set equal to double the number of chunks, in this case, 50. Embodiments of the present invention might instead set the hash table size equal to the nearest power of 2 to 50, which is 64 ($2^6$), thus, the size of the hash table might be rounded up from 50 to 64.

For embodiments of the present invention, to perform this calculation, buffer layer 210 might double the most significant bit (MSB) of the number of items stored in the cache hash table ($25_{10}=11001_2$). Doubling just the MSB of the number of items stored ($10000_2=16_{10}$; $16*2=32_{10}=100000_2$). However, as will be determined at the threshold test of step 1212, $64_{10}$, not $32_{10}$, is the nearest power of 2 to $50_{10}$, which is double the number chunks in the cache. The test of step 1212 are performed by checking the second most significant bit (MSB) of the number of items stored in the cache hash table. When the second MSB is one, the test at step 1212 is true, and the cache hash table size is set to a corresponding size (e.g., rounded to the next higher power of 2) at step 1214. Alternatively, when the second MSB is zero, the test at step 1212 is false and the cache hash table size is decreased (e.g., rounded to the next lower power of 2) at step 1218. In the above example, the second MSB is one ($25_{10}=11001_2$) thus, at step 1218 the cache hash table size is set to the next higher power of 2, which is $64_{10}=1000000_2$.

Further, the operations employed for the computations are relatively simple; for example, a logical AND operation is performed on the number of items stored and a bit mask, and the resulting number is left shifted by one bit, resulting in twice the MSB. If the second MSB is one, the resulting number is left shifted again to equal the higher power of 2; otherwise, the resulting number is the nearest power of 2 and is used as the hash table size. Although embodiments of the present invention test the MSB and the second MSB of the number of items stored in the cache hash table to determine whether the threshold has been reached, other tests are possible. For example, the size of the cache hash table might be updated when a threshold number of entries is crossed between a lower power of 2 and a higher power of 2. For example, a hash table having a size N, where N is a power of 2, might be doubled in size when the number of chunks allocated to the cache exceeds N/2, or any other fixed value.

As described with regard to FIGS. 5 and 6, embodiments of the present invention might store portions of mapping data in a cache in RAM, for example, to provide efficient performance of flash memory controller 104 in i) sequential, ii) sequential streaming, and iii) limited range random data transfers while operating with a relatively limited amount of RAM. Embodiments of the present invention might store in a RAM cache (e.g. at least one of buffers 112 and 114) one or more recently accessed summary pages per each wear-level unit. The summary page cache might employ dynamic hash table sizing, as described with regard to FIGS. 12 and 13. Described embodiments of the present invention might maintain the summary page cache in order of most recently accessed summary page to least recently accessed summary page, although other alternative structures are possible.

FIG. 14 shows exemplary cache data structure 1400. FTL 208 might cache one or more summary pages per each wear-level unit. As shown, each of wear-level units 0-X have a corresponding cache, 1402(0)-1402(X), of summary pages, shown as summary pages 0-W. Thus, each cache 1402(0)-1402(X) might store up to W summary pages associated with the wear-level unit. As will be described subsequently, each cache 1402(0)-1402(X) might maintain a most-recently used list of summary pages for the wear-level unit corresponding to the cache. Cache entries might be "aged" such that the cache entries for the least recently used summary pages are "recycled" to add new summary pages to the cache. Embodiments of the present invention might "age" cache entries by saving a count of how often each entry is accessed. As described with regard to FIGS. 5a and 6a, when there is a cache hit (i.e. the summary page for the requested LBA is stored in the cache), the summary page for the requested LBA is read from RAM and the requested data is read from flash.

When there is a cache miss (i.e. the summary page for the requested LBA is not stored in the cache), the summary page for the requested LBA is read from flash and the requested data is then read from flash.

Figure 15:
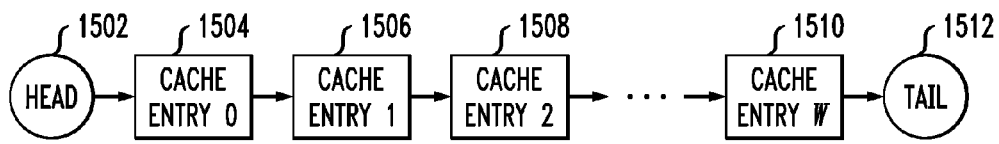
FIG. 15 shows a diagram of a summary page cache in accordance with exemplary embodiments of the present invention.

FIG. 15 shows an exemplary cache for one wear level unit such as, for example, cache 1402(0) of FIG. 14. As shown, cache 1402(0) might be implemented as a linked list, starting at a head end, 1502, with subsequent cache entries 1504, 1506, and so on, until final cache entry 1510. Cache 1402(0) ends at a tail end, 1512. Thus, entry 1502 is the "first" entry in cache 1402(0), and entry 1510 is the "last" entry in cache 1402(0). As will be described subsequently, a summary page cached nearer to head end 1502 has been accessed more recently, and a summary page cached nearer to tail end 1512 has been accessed less recently. As described with regard to FIG. 14, cache 1402(0) might have W entries, where W is a positive integer. In exemplary embodiments of the present invention, W is equal to 3. The summary page caches, such as cache 1402(0), are initialized during startup of flash memory storage system 100. At startup, each cache entry 1504-1510 might be empty. A cache entry might have one of three states: valid, pending, or empty.

Figure 16:
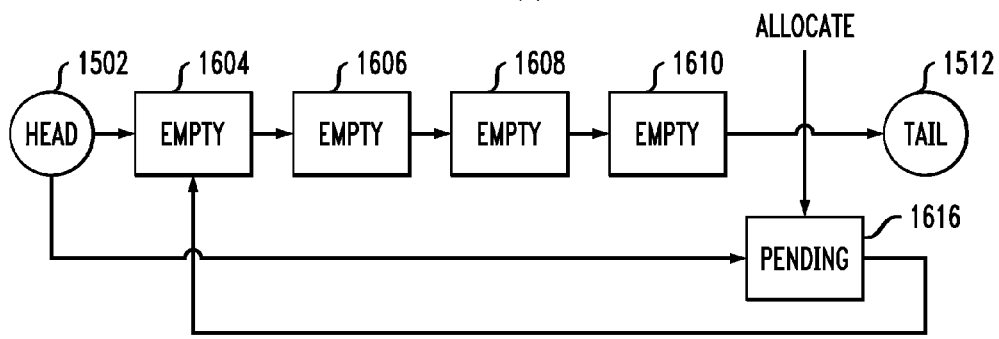
FIG. 16 shows a block diagram of an operation to allocate a summary page cache entry to an empty cache location in accordance with exemplary embodiments of the present invention.

As shown in FIG. 16, allocations of summary pages to cache 1402(0) of FIG. 14 by FTL 208 begin by selecting the last cache entry. As shown, the last cache entry is allocated and its status is set to pending, shown as pending cache entry 1616. Although the exemplary case shown in FIG. 16 shows that the cache entries are empty, the allocation of new cache entries is substantially the same when the cache entries are full: the last cache entry is allocated and obtains pending status. A valid page near tail end 1512 is a less recently accessed entry and can be replaced with a new cache entry. As shown in FIG. 16, head end 1502 is unlinked from cache entry 1604 and is linked to pending cache entry 1616. Pending cache entry 1616 has been unlinked from tail end 1512, and tail end 1512 has been linked to the next closest cache entry, 1610. Thus, pending cache entry 1616 moves to the head end of cache 1402(0) since it is the most recently accessed summary page in cache 1402(0), and the next cache entry from the tail end, 1610, moves to the tail end of cache 1402(0) since it is the least recently accessed summary page in cache 1402(0). A cache entry will maintain pending status until either i) the summary page is read from flash and loaded into the cache, or ii) an abort condition occurs. When the summary page is read from flash and loaded into the cache, the cache entry's status is updated from pending to valid, as described below with respect to FIG. 17. When an abort condition occurs, the cache entry's status is updated from pending to empty, as described below with respect to FIG. 19. In the event that all cache entries have pending status, any subsequent cache allocation requests are denied until one or more of the pending cache entries have been processed.

Figure 17:
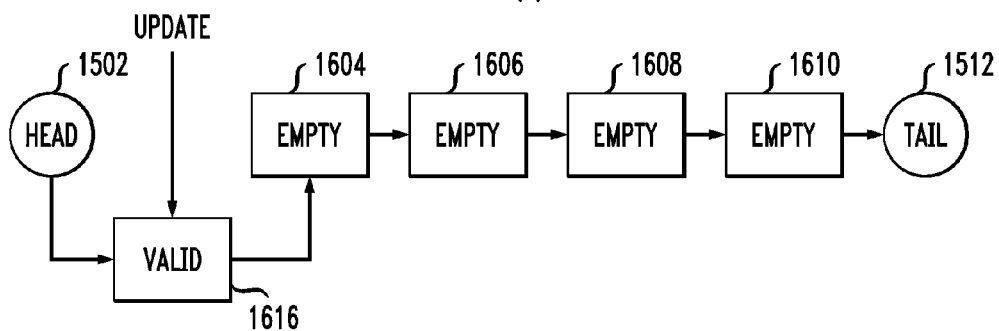
FIG. 17 shows a block diagram of an operation to update a pending cache entry to a valid cache entry to in accordance with exemplary embodiments of the present invention.
Figure 18:
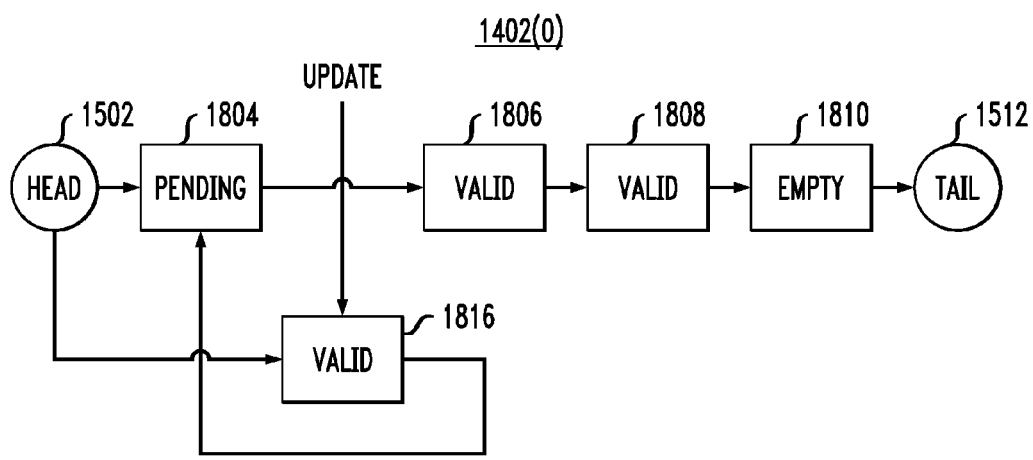
FIG. 18 shows a block diagram of an operation to update a pending cache entry to a valid cache entry to in accordance with exemplary embodiments of the present invention.

FIG. 17 shows an exemplary case where a cache entry is updated from pending status to valid status when the summary page is read from flash and loaded into the cache. FIG. 17 shows a continuation of the exemplary case of FIG. 16. As shown in FIG. 16, cache entry 1616 had pending status and was at the head end of cache 1402(0). FIG. 17 shows that buffer layer 210 updates pending cache entry 1616 to valid status. Cache entry 1616 remains at the head end of cache 1402(0). FIG. 18 shows another exemplary case where a cache entry is updated from pending status to valid status. As shown in FIG. 18, cache 1402(0) contains multiple entries, shown as valid entries 1806 and 1808, and pending entry 1804, as well as containing an empty entry, 1810. FTL 208 updates pending cache entry 1816 to valid status, and cache entry 1816 is moved to the head end of cache 1402(0) by unlinking cache entry 1816 from cache entries 1804 and 1806. Cache entry 1804 is unlinked from head end 1502 and is moved to the next position in the cache when cache entry 1816 is linked to head end 1502 and cache entry 1804. Thus, as shown in FIGS. 17 and 18, whenever a cache entry is updated to valid status, that cache entry is moved to the head end of the cache.

Figure 19:
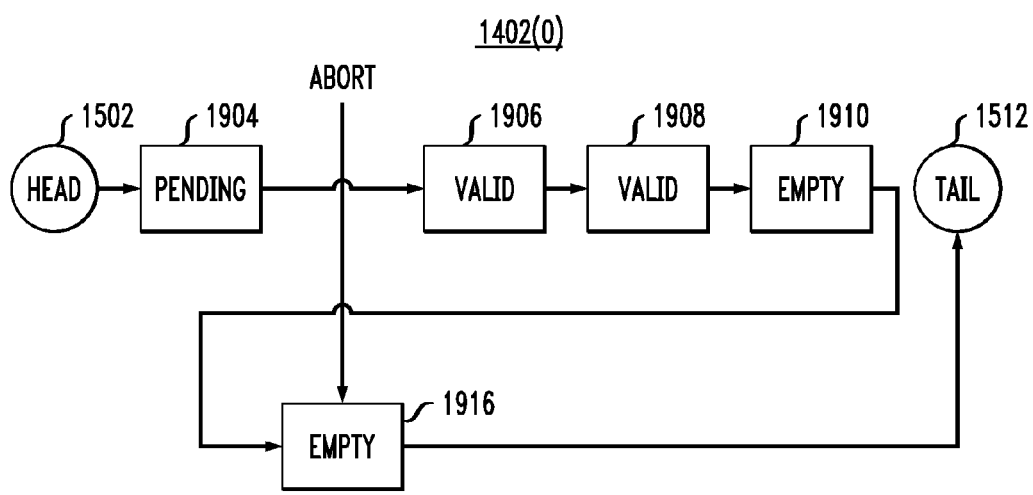
FIG. 19 shows a block diagram of an operation to abort a pending entry to the cache in accordance with exemplary embodiments of the present invention.
Figure 20:
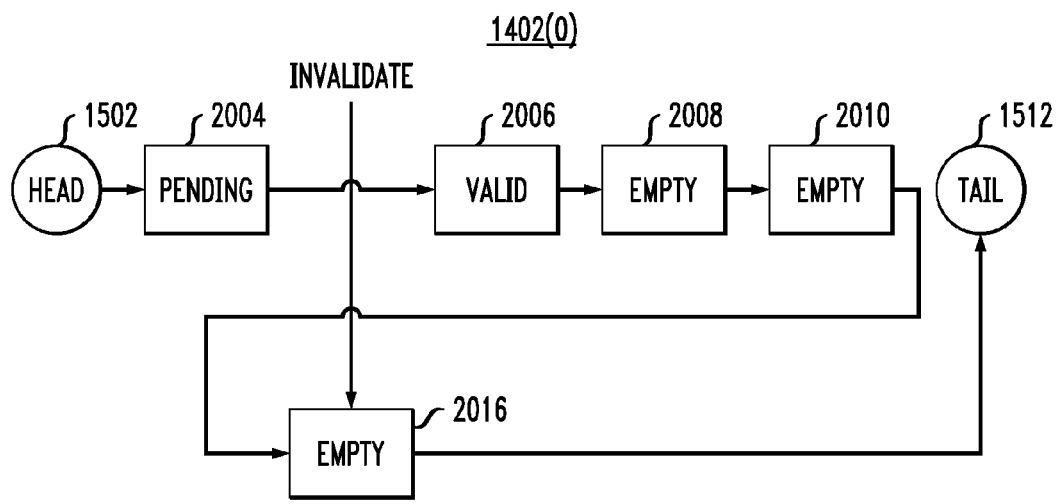
FIG. 20 shows a block diagram of an operation to invalidate a stale cache entry in accordance with exemplary embodiments of the present invention.

FIG. 19 shows an exemplary case where a pending cache entry is aborted. As shown in FIG. 19, FTL 208 aborts pending cache entry 1916. The aborted cache entry is purged and returns to empty status. Empty entry 1916 is moved to the end of cache 1402(0) by being linked to the tail end, 1512, of cache 1402(0). The empty entry is placed at the tail end of the cache and might be reused when a new summary page request is processed by FTL 208.

As described herein, a summary page might be updated as a result of a write operation to flash media 118. When the summary page is updated, the new summary page is given an entry at the head end of cache 1402(0), shown as pending cache entry 2004. The previously cached version of the summary page, shown as cache entry 2016, is stale, and FTL 208 invalidates the entry, which returns to empty status and is moved to the tail end of cache 1402(0).

As described herein, flash memory controller 104 might temporarily store data in RAM buffers. For example, some mapping data might be cached in RAM (e.g. at least one of buffers 112 and 114), for example, summary pages (e.g. summary page 420) might be cached as described with regard to FIG. 14. Further, data being read from, or written to, flash media 118 might be cached in a buffer in RAM (e.g. at least one of buffers 112 and 114), as described with regard to FIGS. 5a and 6a, respectively. Since some data might be cached in RAM, it is possible that data stored in the cache is "dirty", meaning that data stored in the cache is more recent than corresponding data stored in flash media 118. As described herein, data transfers might be segmented into smaller internal data transfers ("chunks"), where each chunk corresponds to a predefined LBA range ("sectors").

Figure 21:
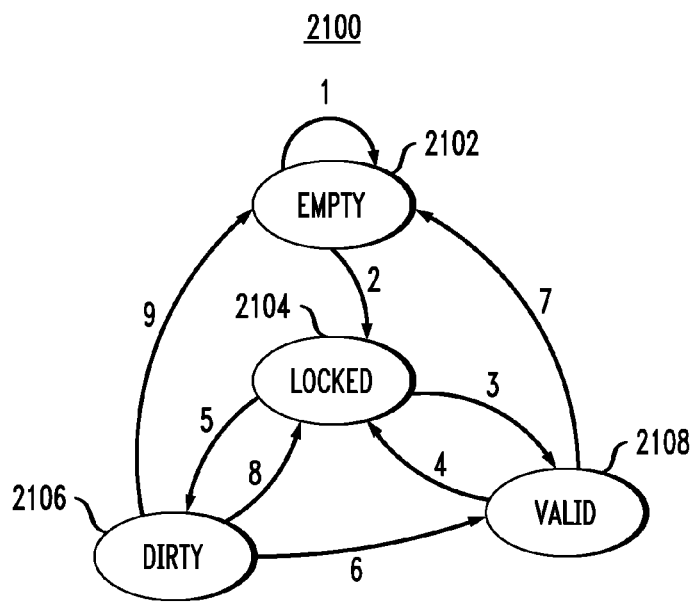
FIG. 21 shows a state transition diagram for a logical block address (LBA) stored in a cache in accordance with exemplary embodiments of the present invention.

FIG. 21 shows a state diagram, 2100, of the possible states of a cached sector. Generally, buffer layer 210 manages the cache and status of cached sectors. As shown, there are four possible states that a cached sector might have: empty (state 2102), locked (state 2104), dirty (state 2106), and valid (state 2108). A cached sector that does not contain any data has empty state 2102, and maintains this state, as shown by state transition 1, until the cached sector is requested as part of a host operation (e.g., for a read operation such as shown in FIG. 5a or a write operation such as shown in FIG. 6a). Once a cached sector is requested as part of a host operation, the sector obtains locked state 2104 as indicated by state transition 2. In general, locked state 2104 might indicate that the sector is currently being filled with data, either from the host or from the media. For example, if the host operation is a read operation (e.g. read operation 500 of FIG. 5a), once the requested sector data is read from flash, the cached sector obtains valid state 2108 as indicated by state transition 3. The cached sector is valid because it contains the same data as stored in flash media 118. A valid cached sector might re-obtain locked state 2104, as indicated by state transition 4, if a subsequent write operation is requested that includes the same sector. That sector would then obtain dirty state 2106, as indicated by state transition 5. The cached sector is dirty because it contains more recent data than the sector stored in flash media 118.

If the host operation is a write operation (e.g., write operation 600 of FIG. 6a), once the requested sector data is provided from host layer 202 to the cached sector, the cached sector obtains dirty status 2106, as indicated by state transition 5. The cached sector is dirty because it contains more recent data than the sector stored in flash media 118. A dirty cached sector obtains valid state 2108 when sector stored in flash media 118 is synchronized with the cached sector, as indicated by state transition 6. The cache-media synchronization operation will be described in greater detail with regard to FIG. 22. A dirty sector might re-obtain locked status 2104, as indicated by state transition 4, if a subsequent write operation is requested that includes the same sector. That sector would then re-obtain dirty state 2106, as indicated by state transition 5. As indicated by state transitions 5 and 8, a sector might transition between locked state 2104 and dirty state 2106 multiple times before a cache-media synchronization occurs and the dirty cached sector obtains valid state 2108 as indicated by state transition 6. A cached sector having valid state 2108 or a cached sector having dirty state 2106 might obtain empty status 2102, as indicated by state transitions 7 and 9, respectively. A dirty or valid sector might become empty if, for example, the sector is included in a range of data invalidated by buffer layer 210. A range of data might be invalidated by buffer layer 210, for example, when the read or write operation is complete and the buffer is deallocated (e.g. step 518 of FIG. 5a or step 618 of FIG. 6a).

Figure 22:
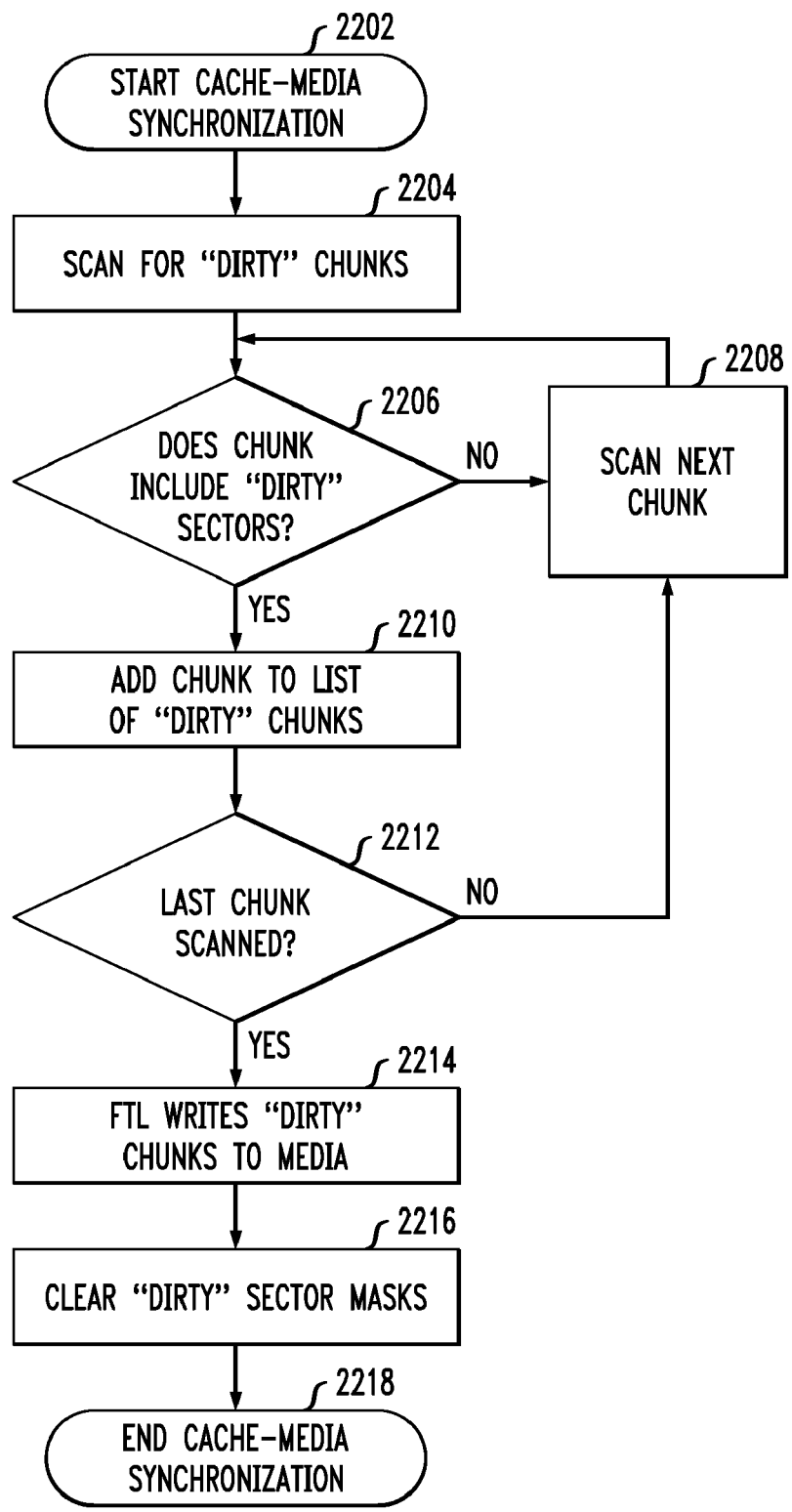
FIG. 22 shows a flow diagram of a cache-media synchronization operation in accordance with exemplary embodiments of the present invention.
Figure 23:
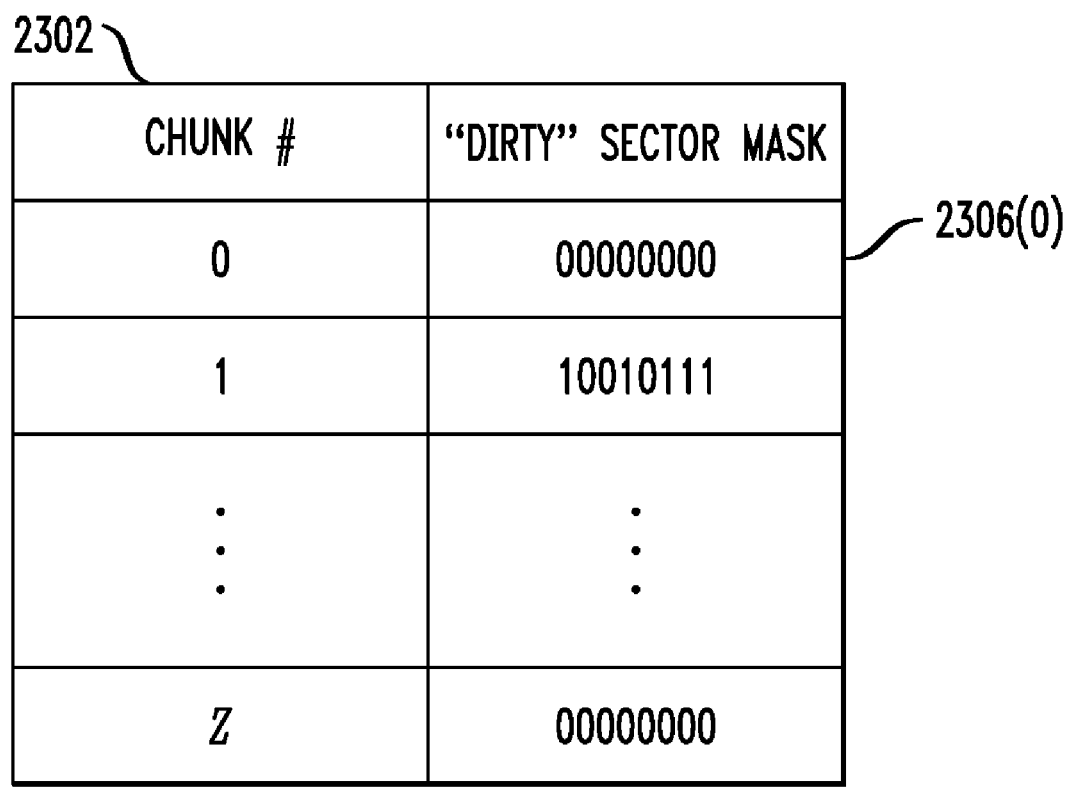
FIG. 23 shows a data structure employed in for cache-media synchronization in accordance with exemplary embodiments of the present invention.

FIG. 22 shows cache-media synchronization operation 2200 performed generally by flash controller 104. At step 2202, cache-media synchronization is initiated, for example, during idle time of flash memory storage system 100. At step 2204, buffer layer 210 scans a chunk table, as will be described with regard to FIG. 23, to find "dirty" chunks. Dirty chunks are chunks having at least one sector stored in the cache that is more recent than the corresponding sector stored in flash media 118. As shown in FIG. 23, dirty chunks are generally tracked by updating the data stored in a dirty sector bitmask corresponding to each chunk.

FIG. 23 shows a table of dirty sector bitmasks 2306(1)-2306(Z) employed in cache-media synchronization. As shown, dirty sector bitmasks 2306(1)-2306(Z) correspond to chunks 2302(1)-2302(Z), where Z is the total number of chunks stored in the cache. As described herein, a chunk might correspond to a fixed LBA range of contiguous sectors. Dirty sector bitmasks 2306(1)-2306(Z) might generally correspond to the state of a sector, as described with regard to FIG. 21. Dirty sector bitmasks 2306(1)-2306(Z) track the status of individual sectors within each chunk 2302(1)-2302(Z). For example, each dirty sector bitmask 2306(1)-2306(Z) has a bit corresponding to each sector in each respective chunk. A "0" in the bit mask might indicate that the cached sector and the sector stored in flash are synchronized; while a "1" in the bit mask might indicate that the sector is dirty (i.e. the cached sector is more recent than the sector stored in flash). As shown in exemplary bitmasks of FIG. 23, each chunk corresponds to 8 sectors (i.e. dirty sector bitmasks 2306(1)-2306(Z) are 8 bits long).

Referring back to FIG. 22, at step 2206, buffer layer 210 scans dirty bitmasks 2306(1)-2306(Z) to determine if any chunks stored in the cache are "dirty". For example, embodiments of the present invention might check if each of bitmasks 2306(1)-2306(Z) is nonzero to determine if a chunk contains dirty sectors. If the current chunk is not dirty, at step 2208, buffer layer 210 scans the next chunk and the process returns to the test of step 2206. If the current chunk is dirty, at step 2210, buffer layer 210 adds the chunk to a list of dirty chunks to be sent to FTL 208 to be written to flash media 118. At step 2212, if there are cached chunks remaining to be scanned, at step 2208, buffer layer 210 scans the next chunk and the process returns back to the test of step 2206. If the last chunk, Z, stored in the cache has been scanned, the process advances to step 2214 where buffer layer 210 provides the data of the dirty chunks to FTL 208 to be written to flash media 118 (e.g. the write operation of FIG. 6a). FTL 208 might optionally confirm that the data was written by reading back the written sectors. At step 2216, buffer layer 210 clears the dirty sector bitmasks 2306(1)-2306(Z) of FIG. 23, and cache-media synchronization is complete at step 2218.

Thus, in embodiments of the present invention, buffer layer 210 might synchronize dirty sectors at a coarse, or "fuzzy", level rather than synchronizing each individual sector. For example, buffer layer 210 merely checks whether dirty sector mask bitmasks 2306(1)-2306(Z) are nonzero, which includes all cases where one or more sectors are dirty. However, buffer layer 210 does not track each individual sector or track how many sectors within a chunk must be updated. Thus, buffer layer 210 might reduce its overhead in controlling cache-media synchronization by only performing synchronization of dirty cache data at a chunk level rather than at a sector level. Buffer layer 210 might send entire chunks of data (possibly including some combination of dirty, valid and empty sectors) to FTL 208 to be written to flash media 118.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software may also be implemented as processes of circuits. Such circuits may be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of transferring, by a media controller, data associated with a host data transfer between a host device and a storage media, the method comprising:
   by a flash translation layer module of the media controller:
      mapping a physical address in the storage media to a logical sector address, wherein the logical sector address corresponds to mapping data comprising: (i) a page index, (ii) a block index, and (iii) a superblock number of the storage media;
      storing the mapping data in at least one summary page corresponding to the superblock containing the physical address;
      storing one or more page offsets of an active block in the superblock in at least one active block table corresponding to the superblock;
      storing a block index and a page index of the at least one summary page and an address of the at least one active block table, for each superblock of the storage device, in a page global directory corresponding to the storage media;
   by a host layer module of the media controller:
      receiving a data request to transfer data between a host device coupled to the media controller and one or more sectors of the storage media, wherein the data request comprises at least one of: (i) a starting logical sector address, (ii) a total number of sectors to be accessed, and (iii) data to be written to the sectors;
      identifying for each data transfer segment, based on the starting logical sector address, a corresponding (i) superblock number, (ii) block index and (iii) page index within the storage media; and
      locating, from the page global directory of the storage device the at least one active block table and the summary page corresponding to the superblock number;
   by a buffer layer module of the media controller:
      segmenting the host data transfer into one or more data transfer segments, wherein each data transfer segment corresponds to at least a portion of the data;
      allocating a number of physical buffers to a virtual circular buffer for buffering the one or more data transfer segments; and
      transferring, by the virtual circular buffer, each of the data transfer segments between the host device and the storage media through the allocated physical buffers, by the steps of:
         if the host data transfer is a host write operation:
            (a) identifying, by the flash translation layer module, physical addresses for each data transfer segment based on (i) the at least one active block table of the superblock, if the physical address is in an active block of the superblock, otherwise, (ii) the summary page of the superblock, based on the block index and page index;
            (b) providing, by a host layer module of the media controller, an initial number of data transfer segments to corresponding ones of the allocated physical buffers, the number of data transfer segments equivalent to the number of allocated physical buffers;
            (c) providing, by the buffer layer module, the number of data transfer segments to the storage media; and
            (d) repeating steps (a), (b) and (c) for each subsequent number of data transfer segments that remain.

2. The method of claim 1, wherein the step of transferring, by the virtual circular buffer, each of the data transfer segments comprises:
   if the host data transfer is a host read operation:
      (e) transferring, by the buffer layer module, an initial number of data transfer segments from the storage media to corresponding ones of the allocated physical buffers, the number of data transfer segments equivalent to the number of allocated physical buffers;
      (f) providing, by the buffer layer module, the number of data transfer segments to the host layer module for transmission to the host device; and
      (g) repeating steps (e) and (f) for each subsequent number of data transfer segments that remain.

3. The method of claim 2, further comprising:
   if the host data transfer is a host write operation:
      performing, in parallel, i) a media-side transfer of step b) for a first number of data transfer segments, and ii) a host-side transfer of step a) for a second number of data transfer segments;
   otherwise, if the host data transfer is a host read operation:
      performing, in parallel, i) a host-side transfer of step e) for a first number of data transfer segments, and ii) a media-side transfer of step d) for a second number of data transfer segments.

4. The method of claim 2, comprising reusing the allocated physical buffers of the virtual circular buffer to buffer each subsequent number of data transfer segments.

5. The method of claim 2, comprising allocating alternate physical buffers to the virtual circular buffer to buffer each subsequent number of data transfer segments.

6. The method of claim 1, wherein, for the method, the storage media comprises flash memory, the flash memory comprising one or more flash memory dies, and wherein one or more virtual circular buffers each correspond to one of the one or more flash memory dies.

7. The method of claim 6, further comprising:
performing, in parallel, one or more host data transfers by the one or more virtual circular buffers, each of the host data transfers between the host device and the one or more flash memory dies transferred through the allocated physical buffers of the one or more virtual circular buffers.

8. The method of claim 1, wherein the initial number of allocated physical buffers is two.

9. The method of claim 8, further comprising:
if the media controller has available buffer resources, allocating one or more additional physical buffers to buffer the data transfer segments.

10. The method of claim 1, wherein the size of the data transfer segments is 256 kB.

11. A non-transitory machine-readable storage medium, having encoded thereon program code, wherein, when the program code is executed by a machine, the machine implements a method of transferring, by a media controller, data associated with a host data transfer between a host device and a storage media, the method comprising:
by a flash translation layer module of the media controller:
mapping a physical address in the storage media to a logical sector address, wherein the logical sector address corresponds to mapping data comprising: (i) a page index, (ii) a block index, and (iii) a superblock number of the storage media;
storing the mapping data in at least one summary page corresponding to the superblock containing the physical address;
storing one or more page offsets of an active block in the superblock in at least one active block table corresponding to the superblock;
storing a block index and a page index of the at least one summary page and an address of the least one active block table, for each superblock of the storage device, in a page global directory corresponding to the storage media;
by a host layer module of the media controller:
receiving a data request to transfer data between a host device coupled to the media controller and one or more sectors of the storage media, wherein the data request comprises at least one of (i) a starting logical sector address, (ii) a total number of sectors to be accessed, and (iii) data to be written to the sectors;
identifying for each data transfer segment, based on the starting logical sector address, a corresponding (i) superblock number, (ii) block index and (iii) page index within the storage media; and
locating, from the page global directory of the storage device, the at least one active block table and the summary page corresponding to the superblock number;
by a buffer layer module of the media controller:
segmenting the host data transfer into one or more data transfer segments, wherein each data transfer segment corresponds to at least a portion of the data;
allocating a number of physical buffers to a virtual circular buffer for buffering the one or more data transfer segments; and
transferring, by the virtual circular buffer, each of the data transfer segments between the host device and the storage media through the allocated physical buffers, by the steps of:
if the host data transfer is a host write operation:
(a) identifying, by the flash translation layer module, physical addresses for each data transfer segment based on (i) the at least one active block table of the superblock, if the physical address is in an active block of the superblock, otherwise, (ii) the summary page of the superblock, based on the block index and page index;
(b) providing, by a host layer module of the media controller, an initial number of data transfer segments to corresponding ones of the allocated physical buffers, the number of data transfer segments equivalent to the number of allocated physical buffers;
(c) providing, by the buffer layer module, the number of data transfer segments to the storage media; and
(d) repeating steps (a), (b) and (c) for each subsequent number of data transfer segments that remain.

12. The non-transitory machine-readable storage medium of claim 11, wherein the step of transferring, by the virtual circular buffer, each of the data transfer segments comprises:
if the host data transfer is a host read operation:
(e) transferring, by the buffer layer module, an initial number of data transfer segments from the storage media to corresponding ones of the allocated physical buffers, the number of data transfer segments equivalent to the number of allocated physical buffers;
(f) providing, by the buffer layer module, the number of data transfer segments to the host layer module for transmission to the host device; and
(g) repeating steps (e) and (f) for each subsequent number of data transfer segments that remain.

13. The non-transitory machine-readable storage medium of claim 12, further comprising:
if the host data transfer is a host write operation:
performing, in parallel, i) a media-side transfer of step b) for a first number of data transfer segments, and ii) a host-side transfer of step a) for a second number of data transfer segments;
otherwise, if the host data transfer is a host read operation:
performing, in parallel, i) a host-side transfer of step e) for a first number of data transfer segments, and ii) a media-side transfer of step d) for a second number of data transfer segments.

14. The non-transitory machine-readable storage medium of claim 12, comprising reusing the allocated physical buffers of the virtual circular buffer to buffer each subsequent number of data transfer segments.

15. The non-transitory machine-readable storage medium of claim 12, comprising allocating alternate physical buffers to the virtual circular buffer to buffer each subsequent number of data transfer segments.

16. The non-transitory machine-readable storage medium of claim 11, wherein, for the method, the storage media comprises flash memory, the flash memory comprising one or more flash memory dies, and wherein one or more virtual circular buffers each correspond to one of the one or more flash memory dies.

17. The non-transitory machine-readable storage medium of claim 16, further comprising:
performing, in parallel, one or more host data transfers by the one or more virtual circular buffers, each of the host data transfers between the host device and the one or more flash memory dies transferred through the allocated physical buffers of the one or more virtual circular buffers.

18. The non-transitory machine-readable storage medium of claim 11, further comprising:

if the media controller has available buffer resources, allocating one or more additional physical buffers to buffer the data transfer segments.

19. A media controller, the media controller implemented as at least one integrated circuit, for synchronizing data cached in a buffer of the media between a host device and at least one storage media, the media controller comprising:
   a host layer module configured to:
      send data to, and receive data from, the communication link, wherein data requests are received from the at least one external device, and wherein the data requests comprise (i) a starting logical sector address and (ii) a span of sectors to be transferred;
   a flash translation layer module configured to:
      maintain at least one active block table corresponding to each superblock, the active block table for storing one or more page offsets of an active block in the corresponding superblock;
      maintain at least one summary page for storing mapping data corresponding to each superblock, wherein the mapping data maps a physical address in the storage device to a logical sector address, the mapping in data comprising: (iii) ii a block index, and iii a superblock number;
      maintain a page global directory for storing a block index and a page index of the at least one summary page and an address of the at least active block table for each superblock of the storage device;
   a buffer layer module configured to:
      segment the host data transfer into one or more data transfer segments, wherein each data transfer segment corresponds to at least a portion of the data; and
      allocate one or more physical buffers to a virtual circular buffer;
   the flash translation layer module configured to, for each data transfer segment:
      identify, based on the starting logical sector address, a corresponding (i) superblock number, (ii) block index and (iii) page index within the storage media for each data transfer segment;
      locate, from the page global directory of the storage device, the at least one active block table and the summary page corresponding to the superblock number; and
      iteratively identify physical addresses for each data transfer segment based on (i) the at least one active block table of the superblock, if the physical address is in an active block of the superblock, otherwise, (ii) the summary page of the superblock, based on the block index and page index;
   wherein, if the host data transfer is a host write operation:
      the host layer module transfers an initial number of data transfer segments to corresponding ones of an initial number of allocated physical buffers of the virtual circular buffer, the initial number of data transfer segments equivalent to the initial number of allocated physical buffers;
      the buffer layer module transfers, in parallel, i) the initial number of data transfer segments to the storage media, at the corresponding physical addresses identified by the flash translation layer module, from the virtual circular buffer, and ii) one or more subsequent numbers of data transfer segments from the host layer module to corresponding ones of allocated physical buffers of the virtual circular buffer for remaining data transfer segments;
   otherwise, if the host data transfer is a host read operation:
      the buffer layer module transfers an initial number of data transfer segments from the storage media, at the corresponding physical addresses identified by the flash translation layer module, to corresponding ones of the allocated physical buffers of the virtual circular buffer, the initial number of data transfer segments equivalent to the initial number of allocated physical buffers; and
      the buffer layer module transfers, in parallel, i) the initial number of data transfer segments from the virtual circular buffer to the host layer module, and ii) one or more subsequent numbers of data transfer segments from storage media, at the corresponding physical addresses identified by the flash translation layer module, to subsequent corresponding ones of allocated physical buffers of the virtual circular buffer for remaining data transfer segments.

20. The media controller of claim 19, wherein the media controller is implemented in a monolithic integrated circuit chip.

* * * * *